United States Patent
Takeda et al.

(10) Patent No.: US 10,117,192 B2
(45) Date of Patent: Oct. 30, 2018

(54) USER TERMINAL, RADIO BASE STATION AND RADIO COMMUNICATION METHOD

(71) Applicant: NTT DOCOMO, INC., Tokyo (JP)

(72) Inventors: Kazuki Takeda, Tokyo (JP); Tooru Uchino, Tokyo (JP); Satoshi Nagata, Tokyo (JP); Kohei Kiyoshima, Tokyo (JP)

(73) Assignee: NTT DOCOMO, INC., Tokyo (JP)

( * ) Notice: Subject to any disclaimer, the term of this patent is extended or adjusted under 35 U.S.C. 154(b) by 0 days.

(21) Appl. No.: 15/110,957

(22) PCT Filed: Jan. 13, 2015

(86) PCT No.: PCT/JP2015/050572
§ 371 (c)(1),
(2) Date: Jul. 12, 2016

(87) PCT Pub. No.: WO2015/108009
PCT Pub. Date: Jul. 23, 2015

(65) Prior Publication Data
US 2016/0337984 A1    Nov. 17, 2016

(30) Foreign Application Priority Data

Jan. 14, 2014 (JP) .................................. 2014-004182

(51) Int. Cl.
| | | |
|---|---|---|
| *H04W 52/24* | (2009.01) | |
| *H04W 52/22* | (2009.01) | |
| *H04W 72/04* | (2009.01) | |
| *H04W 52/06* | (2009.01) | |
| *H04W 52/08* | (2009.01) | |
| *H04W 52/14* | (2009.01) | |

(52) U.S. Cl.
CPC ......... *H04W 52/248* (2013.01); *H04W 52/06* (2013.01); *H04W 52/08* (2013.01);
(Continued)

(58) Field of Classification Search
CPC ............. H04W 52/248; H04W 52/146; H04W 52/228; H04W 72/0446; H04W 72/0473; H04W 72/0413
See application file for complete search history.

(56) References Cited

U.S. PATENT DOCUMENTS 9,419,766 B2 *   8/2016   Takeda ................. H04L 5/0053
9,635,705 B2 *   4/2017   Lu ......................... H04W 84/00
(Continued)

FOREIGN PATENT DOCUMENTS

| EP | 2849504 A1 | 3/2015 |
|---|---|---|
| WO | 2013/168791 A1 | 11/2013 |
| WO | 2015005461 A1 | 1/2015 |

OTHER PUBLICATIONS

Extended European Search Report dated Jun. 30, 2017, in corresponding European Patent Application No. 15737872.0 (16 pages).
(Continued)

*Primary Examiner* — Wei Zhao
(74) *Attorney, Agent, or Firm* — Osha Liang LLP

(57) ABSTRACT

The present invention is designed so that mismatches in the recognition of TPC command-accumulated values between a radio base station and a user terminal are resolved in a simple way. The user terminal of the present invention provides a user terminal that transmits uplink channels, and that has a receiving section that receives transmission power control (TPC) commands from each of a plurality of cells that are grouped, a control section that controls the uplink channel transmission power of each of the multiple cells based on accumulated values of the TPC commands, and, when a reset condition is fulfilled in one of the multiple cells, the control section resets the accumulated values of all of the multiple cells.

6 Claims, 17 Drawing Sheets

(52) U.S. Cl.
CPC ..... *H04W 52/228* (2013.01); *H04W 72/0413* (2013.01); *H04W 72/0446* (2013.01); *H04W 72/0473* (2013.01); *H04W 52/146* (2013.01)

(56) References Cited

U.S. PATENT DOCUMENTS

| | | | | |
|---|---|---|---|---|
| 2015/0341866 | A1* | 11/2015 | Park | H04W 52/146 455/522 |
| 2016/0165547 | A1 | 6/2016 | Ouchi et al. | |
| 2016/0242125 | A1* | 8/2016 | Lee | H04W 52/246 |

OTHER PUBLICATIONS

ZTE et al., "WF on uplink power control in TDD eIMTA," 3GPP TSG RAN WG1 #75, R1-135942, Nov. 11-15, 2013, San Francisco, USA (2 pages).

InterDigital Communications, "eIMTA PHR," 3GPP TSG-RAN WG2 #84, R2-134230, Nov. 11-15, 2013, San Francisco, US (4 pages).

Media Tek Inc., "RAN2 Impact of Supporting eIMTA," 3GPP TSG-RAN2 #84 Meeting, R2-134068, Nov. 11-15, 2013, San Francisco, USA (6 pages).

Qualcomm Incorporated, "Configurable UL TPC accumulation," 3GPP TSG RAN WG1 #75, R1-135287, Nov. 11-15, 2013, San Francisco, USA (4 pages).

Motorola Mobility, "Additional clarifications/corrections for introducing Rel-11 features," 3GPP TSG-RAN1 Meeting #72, R1-130836, Jan. 28-Feb. 1, 2013, St. Julian's, Malta (163 pages).

3GPP TS 36.213 V11.1.0, "3rd Generation Partnership Project; Technical Specification Group Radio Access Network; Evolved Universal Terrestrial Radio Access (E-UTRA); Physical layer procedures (Release 11)"; Dec. 2012 (160 pages).

International Search Report issued in corresponding application No. PCT/JP2015/050572 dated Apr. 7, 2015 (3 pages).

Written Opinion of the International Searching Authority issued in corresponding application No. PCT/JP2015/050572 dated Apr. 7, 2015 (5 pages).

3GPP TS 36.213 V11.3.0, "3rd Generation Partnership Project; Technical Specification Group Radio Access Network; Evolved Universal Terrestrial Radio Access (E-UTRA); Physical layer procedures (Release 11)"; Jun. 2013 (176 pages).

3GPP TS 36.213 V11.5.0, "3rd Generation Partnership Project; Technical Specification Group Radio Access Network; Evolved Universal Terrestrial Radio Access (E-UTRA); Physical layer procedures (Release 11)"; Dec. 2013 (10 pages).

Samsung, "Power Control for eIMTA"; 3GPP TSG RAN WG1 #72bis, R1-131007; Chicago, USA; Apr. 15-19, 2013 (4 pages).

* cited by examiner

| TPC COMMAND FIELD IN DCI FORMAT 0/3/4 | ACCUMULATED VALUE [DB] | TPC COMMAND FIELD IN DCI FORMAT 3A | ACCUMULATED VALUE [DB] |
|---|---|---|---|
| 0 | −1 | 0 | −1 |
| 1 | 0 | 1 | 1 |
| 2 | 1 | — | — |
| 3 | 3 | — | — |

FIG.2

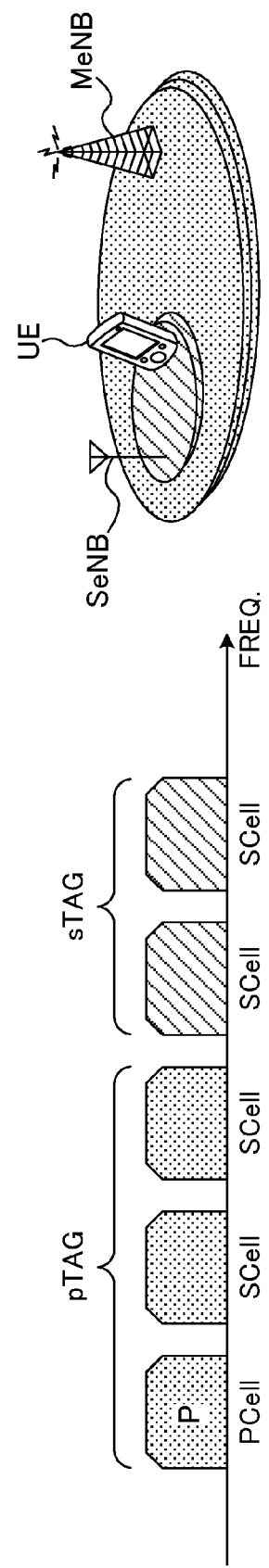
FIG.3A
FIG.3B

FIXED SUBFRAME

FIXED SUBFRAME

FLEXIBLE SUBFRAME

FLEXIBLE SUBFRAME

USER TERMINAL, RADIO BASE STATION AND RADIO COMMUNICATION METHOD

TECHNICAL FIELD

The present invention relates to uplink transmission power control in a next-generation communication system.

BACKGROUND ART

Presently, in 3GPP, the standardization of LTE-advanced, which is an enhanced system of LTE (Long Term Evolution) (also referred to as "LTE Release 8" (Rel. 8), is in progress (hereinafter the specifications of LTE Release 10 (Rel. 10) and later versions will be collectively referred to as "LTE-A").

In radio communication systems such as LTE and LTE-A (LTE Rel. 8-11), uplink transmission power control to use both open-loop control and closed-loop control is introduced (see, for example, non-patent literature 1). To repair the path loss between user terminals and radio base stations, open-loop control is executed based on the path loss calculated by the user terminals and parameters reported from the radio base stations to the user terminals on a semi-static basis. For example, these parameters are reported to the user terminals through higher layer signaling such as RRC (Radio Resource Control) signaling.

On the other hand, closed-loop control is executed in order to maintain the received quality of an uplink shared channel (PUSCH: Physical Uplink Shared Channel) and an uplink control channel (PUCCH: Physical Uplink Control Channel) in radio base stations, based on TPC (Transmission Power Control) commands reported from the radio base stations to user terminals on a dynamic basis. TPC commands represent values to increase and decrease transmission power, and are included in, for example, downlink control information (DCI: Downlink Control Information) that is transmitted in downlink control channels (PDCCH (Physical Downlink Control Channel) and EPDCCH (Enhanced Physical Downlink Control Channel)).

CITATION LIST

Non-Patent Literature

Non-Patent Literature 1: 3GPP TS 36. 213 v11. 3. 0 "Evolved Universal Terrestrial Radio Access (E-UTRA), Physical Layer Procedures"

SUMMARY OF INVENTION

Technical Problem

The above-noted closed-loop control can adopt accumulation mode, in which the increase/decrease values of transmission power, represented by TPC commands, are accumulated, and the resulting accumulated values (hereinafter referred to as "TPC command-accumulated values") are used. In accumulation mode, the transmission power of user terminals can be controlled adequately by using TPC command-accumulated values.

However, in accumulation mode, cases might occur where the recognition of TPC command-accumulated values does not match between a radio base station and a user terminal. One reason is that, if the user terminal's transmission power has reached the upper limit value, the user terminal no longer accumulates the increase/decrease values represented by TPC commands that are received, but the radio base station is not even aware of this. Another reason is that, if the user terminal fails to receive DCI that contains a TPC command, the user terminal also naturally fails to accumulate the increase/decrease value represented by this TPC command, but the radio base station is not even aware of this.

In this way, when a mismatch in the recognition of TPC command-accumulated values occurs between a radio base station and a user terminal, there is no way of knowing, accurately, the user terminals' extra transmission power on the radio base station side, and therefore there is a threat that the radio base station cannot adequately control the user terminals' transmission power, radio resource allocation, and so on So, there is a demand to resolve mismatches in the recognition of TPC command-accumulated values, such as those described above, by resetting the TPC command-accumulated values in the user terminal (back to the initial values).

The present invention has been made in view of the above, and it is therefore an object of the present invention to provide a user terminal, a radio base station and a radio communication method, which can resolve mismatches in the recognition of TPC command-accumulated values between radio base stations and user terminals in a simple way.

Solution to Problem

The user terminal of the present invention provides a user terminal that controls uplink transmission power, and that has a receiving section that receives transmission power control (TPC) commands, and a control section that controls uplink transmission power based on an accumulated value of the TPC commands, and, in this user terminal, when subframes in a radio frame are divided into a plurality of subframe sets, the control section calculates the accumulated value of the TPC commands on a per subframe set basis, and controls resetting of the accumulated value of the TPC commands on a per subframe set basis, based on predetermined reset conditions.

Advantageous Effects of Invention

According to the present invention, it is possible to resolve mismatches in the recognition of TPC command-accumulated values between radio base stations and user terminals in a simple way.

BRIEF DESCRIPTION OF DRAWINGS

FIG. 2 is a diagram to explain examples of TPC commands;

FIG. 3 provides diagrams to explain uplink transmission using carrier aggregation (CA);

DESCRIPTION OF EMBODIMENTS

Figure 1:
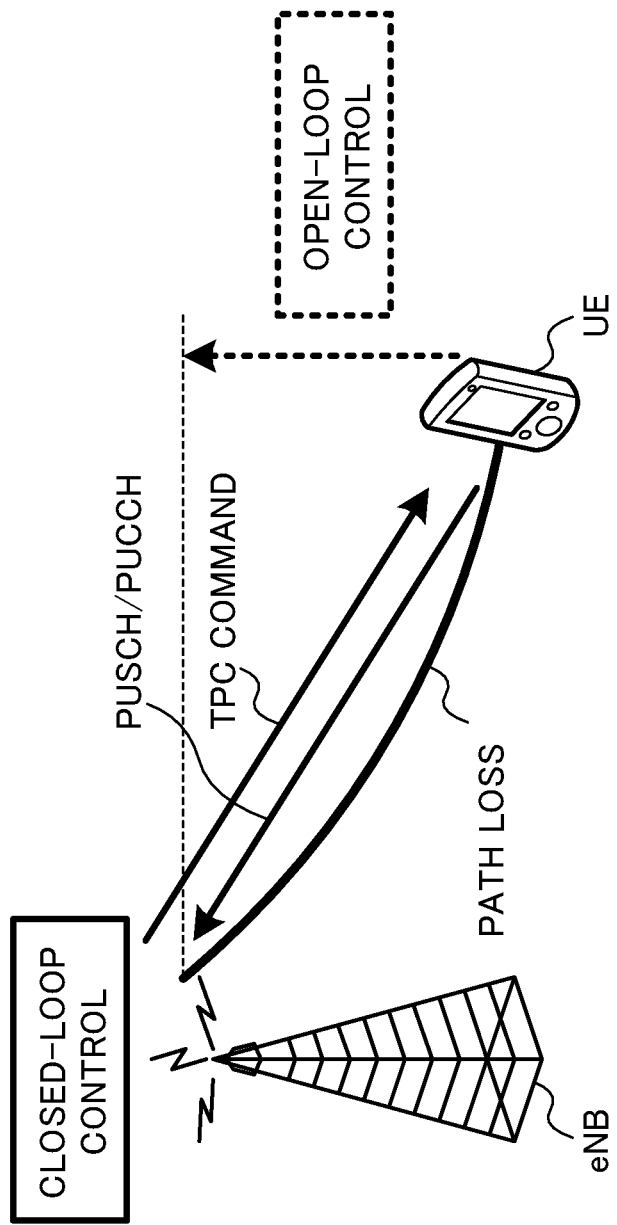
FIG. 1 is a conceptual diagram of uplink transmission power control.

FIG. 1 is a conceptual diagram of uplink transmission power control. Referring to FIG. 1, the transmission power of the user terminal (UE: User Equipment) is controlled using both open-loop control, which repairs the path loss between the radio base station (eNB: eNodeB) and the user terminal, and closed-loop control. For example, the transmission power of an uplink shared channel (PUSCH) is determined by following equation 1:

$$P_{PUSCH,c}(i) = \min\begin{Bmatrix} P_{CMAX,c}(i), \\ 10\log_{10}(M_{PUSCH,c}(i)) + P_{O\_PUSCH,c}(j) + \\ \alpha_c(j) \cdot PL_c + \Delta_{TF,c}(i) + f_c(i) \end{Bmatrix} [dBm] \quad \text{(Equation 1)}$$

In above equation 1, i is an index to represent a subframe. j is an index to represent the type of scheduling. $P_{CMAX,c}(i)$ is the maximum possible transmission power of the user terminal. $M_{PUSCH,c}(i)$ is the bandwidth allocated to the user terminal. $P_{O\_PUSCH,c}(j)$ is the transmission power offset, which is used to fulfill the target received power (desired received power) in the radio base station. $\Delta_{TF,c}(i)$ is an offset that depends on MCS (Modulation and Coding Scheme).

Also, in above equation 1, $PL_c$ is the path loss, which the user terminal calculates from the received power (for example, RSRP: Reference Signal Received Power) of downlink reference signals. $\alpha_c(j)$ is a predetermined coefficient for repairing path loss. $\alpha_c(j)$ is reported from the radio base station to the user terminal through higher layer signaling such as RRC signaling. Open-loop control is executed based on $PL_c$ and $\alpha_c(j)$.

Also, in above equation 1, $f_c(i)$ is an increase/decrease value of transmission power, which is determined based on a TPC command. The radio base station measures the received quality (for example, RSRQ: Reference Signal Received Quality) of an uplink signal, and determines a TPC command based on the measurement result. The TPC command is included in DCI, which is transmitted in a downlink control channel (PDCCH, EPDCCH, etc.) (also referred to as "L1/L2 control signal" and/or the like).

For example, when controlling the transmission power of an uplink shared channel (PUSCH), two-bit TPC commands, which are included in PUSCH allocation information (UL grants) (also referred to as "DCI format 0/4"), are used. Alternatively, user terminal-specific TPC commands (directed to subject terminals) of one or two bits may be used, which are included in DCI format 3/3A, may be used.

Also, when controlling the transmission power of an uplink control channel (PUCCH), two-bit TPC commands, which are included in downlink shared channel (PDSCH: Physical Downlink Shared Channel) allocation information (DL assignments) (also referred to as "DCI format 1/1A/1B/1C/2A/2B/2C/2D"), are used. Alternatively, user terminal-specific TPC commands (directed to subject terminals) of one or two bits may be used, which are included in DCI format 3/3A, may be used.

In this way, closed-loop control is executed using TPC commands that are reported from the radio base station to the user terminal on a dynamic basis. To be more specific, in accumulation mode, $f_c(i)$ in above equation 1 is given by following equation 2:

$$f_c(i) = f_c(i-1) + \delta_{PUSCH,c}(i - K_{PUSCH}) \quad \text{(Equation 2)}$$

In equation 2, $\delta_{PUSCH,c}(i - K_{PUSCH})$ is an increase/decrease value of transmission power (value to be accumulated), which is represented by a TPC command included in DCI in a subframe $(i - K_{PUSCH})$. In equation 2, the TPC command-accumulated value $f_c(i)$ in subframe i is calculated based on the TPC command-accumulated value $f_c(i-1)$ in subframe (i−1) and the increase/decrease value $\delta_{PUSCH,c}(i - K_{PUSCH})$ represented by the above TPC command.

FIG. 2 is a diagram to explain examples of TPC commands. Referring to FIG. 2, TPC commands represent increase/decrease values of transmission power (values to be accumulated). For example, the two-bit TPC commands that are included in DCI format 0/3/4 represent four types of increase/decrease values (−1, 0, 1, 3). On the other hand, the one-bit TPC commands that are included in DCI format 3a represent two types of increase/decrease values (−1, 1).

In this way, in accumulation mode, $f_c(i)$ of equation 1 is the TPC command-accumulated value in subframe i. This accumulation mode, as described above, anticipates cases where the recognition of TPC command-accumulated values does not match between a radio base station and a user terminal. So, a study is in progress to resolve mismatches in the recognition of TPC command-accumulated values by resetting TPC command-accumulated values in a user terminal (back to the initial values) when a predetermined reset condition is fulfilled. Here, resetting a TPC command-accumulated value (back to the initial value) means replacing the TPC command-accumulated value with a value that is determined in advance between a radio base station and a user terminal. For this value, for example, it may be possible to replace $f_c(i)$ with a zero, or replace it right after random access procedures. Also, as for the reset condition, for example, a study is in progress to use the following first reset condition or the second reset condition.

<First Reset Condition>

The first reset condition is fulfilled when the value of transmission power offset (for example, $P_{O\_PUSCH,c}$ in above equation 1 in the event of the PUSCH, and $P_{O\_UE\_PUCCH}$ in the event of the PUCCH) is changed by a higher layer.

In the above first reset condition, even when the target received power in a radio base station does not change, the transmission power offset values ($P_{O\_PUSCH,c}$, $P_{O\_UE\_PUCCH}$) need to be changed so as to reset the TPC command-accumulated values. Also, according to the above first reset condition, RRC reconfiguration is carried out between a radio base station and a user terminal, and therefore there is a threat that limitations may be placed on communication. To be more specific, since the radio base station is unable to know in what timing during RRC reconfiguration the user terminal will change the transmission power offset value, there is a threat that the radio base station cannot fully allocate radio resources for transmission to the user terminal.

<Second Reset Condition>

The second reset condition is fulfilled when a user terminal receives a random access response from the target cell for transmission power control (for example, the serving cell in the event of the PUSCH, and the primary cell in the event of the PUCCH).

In the above second reset condition, even when there is no gap in synchronization, random access procedures (Random Access Channel (RACH) procedures) need to be carried out in order to reset TPC command-accumulated values. In random access procedures, the user terminal transmits a random access preamble to the radio base station, and the radio base station transmits a random access response to the user terminal. During random access procedures, the user terminal temporarily releases the CQI (Channel Quality Indicator) resources and SR (Scheduling Request) resources. Consequently, the radio base station becomes unable to know the condition of the user terminal in detail and unable to resume adequate scheduling quickly, and therefore there is a threat that limitations might be placed on communication.

As described above, the above first and second reset conditions risk increased overhead, placing limitations on communication and so on, and there is a threat that TPC command-accumulated values cannot be reset flexibly. So, in order to resolve mismatches in the recognition of TPC command-accumulated values, the present inventors have studied a radio communication method whereby TPC command-accumulated values can be reset in a simple manner.

(First Aspect)

Now, a radio communication control method according to the first aspect will be described with reference to FIGS. 3 to 5. In the radio communication method according to the first aspect, when a user terminal carries out uplink transmission in a plurality of cells, the TPC command-accumulated value of each of these multiple cells can be reset in a simple way.

FIG. 3 provide diagrams to explain uplink transmission using carrier aggregation (CA). FIG. 3A shows an example of uplink transmission using Rel. 10 CA. FIG. 3B shows an example of uplink transmission using Rel. 11 CA. Note that, referring to FIGS. 3A and 3B, the cells have a predetermined frequency band (for example, 20 MHz), and may be referred to as component carriers (CCs), carriers and so on. Also, the cells include a PCell (Primary Cell), which is used to establish connection, and at least one SCell (Secondary Cell), which is provided on a secondary basis after connection is established.

As shown in FIG. 3A, Rel. 10 CA presumes operation in an environment in which a plurality of cells that are provided in a single transmitting point (radio base station) are bundled, and uplink transmission is carried out in these multiple cells in the same timing. In FIG. 3A, uplink transmission power control is executed on a per cell basis, so that it is necessary to reset the above TPC command-accumulated values in each cell.

On the other hand, in Rel. 10 CA, random access procedures are carried out in the PCell, but are not carried out in SCells. This is because uplink transmission is carried out in the same timing regardless of the number of cells configured in CA. Consequently, SCells are unable to use the above second reset condition, and it is necessary to change the transmission power offset values ($P_{O\_PUSCH,c}$, $P_{O\_UE\_PUCCH}$) in order to reset TPC command-accumulated values by using the above first reset condition.

Also, referring to FIG. 3B, Rel. 11 CA presumes operation in an environment in which at least one cell that is provided in a plurality of transmitting points (radio base stations) is bundled. Note that a plurality of transmitting points may include, for example, a radio base station that forms a macro cell having a relatively large coverage (hereinafter referred to as a "macro base station (MeNB)"), and a radio base station that forms a small cell having a relatively small coverage (hereinafter referred to as a "small base station (SeNB)").

Consequently, in Rel. 11 CA, MTA (Multiple Timing Advance) is introduced in order to enable uplink reception in a plurality of different transmitting points. MTA refers to configuring uplink transmission timings (TA: Timing Advance) to different values between cells where CA is configured. At least one cell to use the same transmission timing is grouped, which is referred to as "TA group (TAG: Timing Advance Group)," for example. Note that, in MTA, different TA values may be configured between cells of varying transmitting points.

For example, referring to FIG. 3B, the three cells that are provided in the macro base station and the two cells that are provided in the small base station are grouped, separately, forming a pTAG (primary TAG) and an sTAG (secondary TAG), respectively. In the pTAG, which includes a PCell, SCell transmission timings and PCell transmission timings are configured to be the same. On the other hand, in the sTAG, which does not include a PCell (and which includes only SCells), all the SCells' transmission timings are configured to be the same.

Also, in Rel. 11 CA, random access procedures can be carried out not only in PCells, but also in SCells as well. Consequently, in FIG. 3B, random access procedures are carried out in the PCell of the pTAG, provided in the macro base station, and in one of the SCells of the sTAG, provided in the small base station. In this way, the user terminal carries out random access procedures between the user terminal and each transmitting point, so that gaps in synchronization between the user terminal and each transmitting point can be prevented.

In this way, in Rel. 11 CA, at least one cell in the same transmitting point is likely to be configured in the same TAG. Consequently, when random access procedures are executed in a given cell in a TAG, the transmission timings of all cells in this TAG have to be reconfigured. Meanwhile, TPC command-accumulated values can be reset only in cells where random access procedures are executed.

Figure 4:
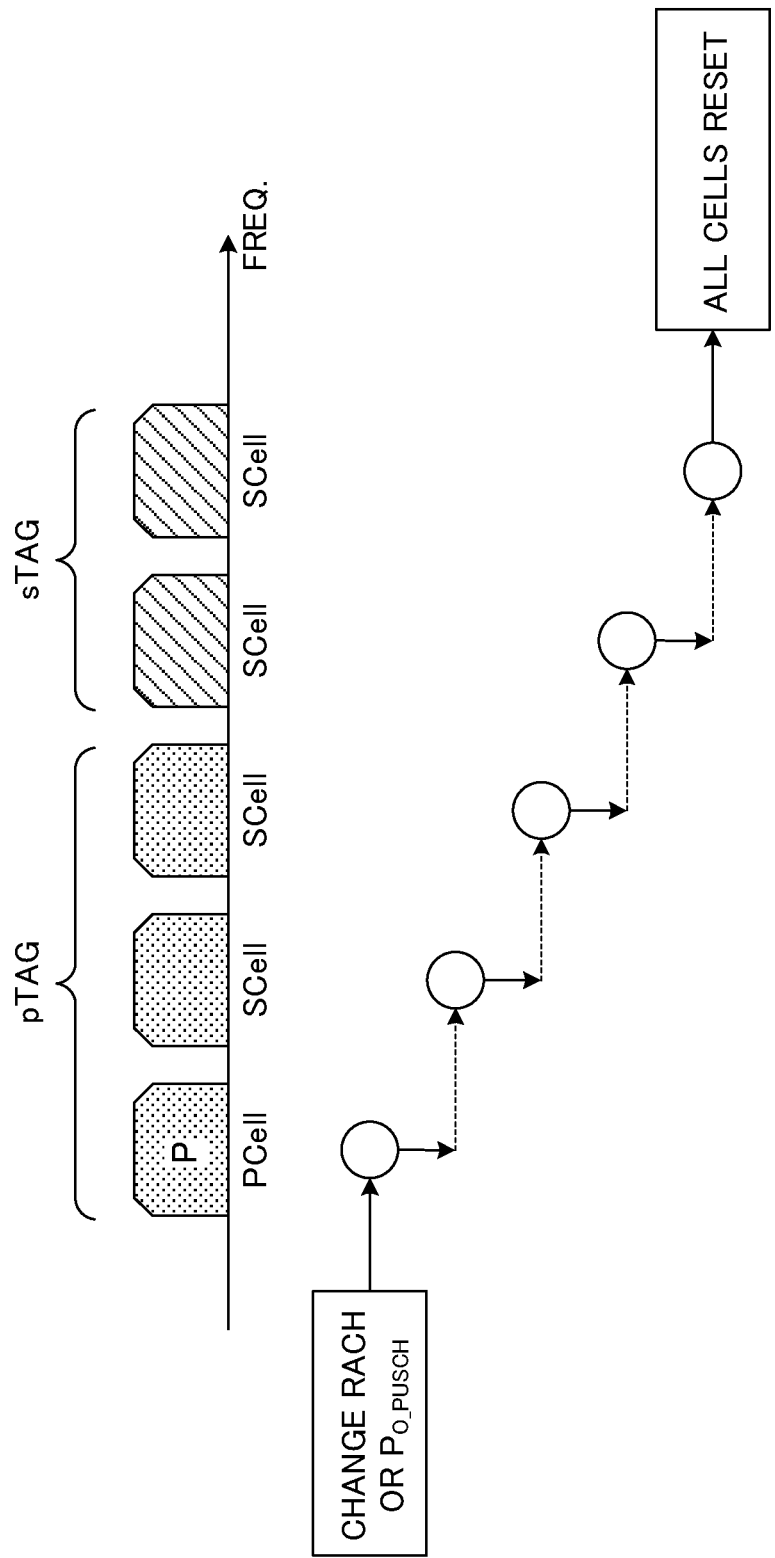
FIG. 4 is a diagram to explain an example of resetting TPC command-accumulated values.

Consequently, as shown in FIG. 4, in order to reset the TPC command-accumulated values of all cells in a TAG, for each cell in the TAG, it is necessary to change the transmission power offset value ($P_{O\_PUSCH,c}$, $P_{O\_UE\_PUCCH}$) based on the above-described first reset condition, or carry out random access procedures based on the above-noted second reset condition. As a result of this, there has heretofore been a problem that resetting the TPC command-accumulated values of all cells in a TAG requires complex (unnecessary) procedures, and is time-consuming.

So, the present inventors have come up with the idea of simplifying the process of resetting the TPC command-accumulated values of a plurality of cells and reducing the processing time by re-setting the TPC command-accumulated values of a plurality of grouped cells all together.

With the radio communication method according to the first aspect, a user terminal receives individual TPC commands from a plurality of cells that are grouped. Also, based on the TPC command-accumulated values that are given by accumulating the increase/decrease values represented by the TPC commands, the user terminal controls the individual uplink channel transmission power of each of the multiple cells. Also, when the reset condition is fulfilled in one of the multiple cells that are grouped, the user terminal resets all the TPC command-accumulated values of the multiple cells.

Here, a plurality of cells may be grouped into timing advance groups (TAGs). As described earlier, a TAG is formed with a plurality of cells in which the same transmission timing (TA) is used. This TAG may be formed with a plurality of cells under the same radio base station. Note that a TAG to include a PCell may be referred to as a "pTAG," and a TAG that does not include a PCell may be referred to as an "sTAG."

Alternatively, a plurality of cells may be grouped into cell groups (CGs) of dual connectivity (DC). Dual connectivity refers to the kind of communication which a user terminal carries out by connecting with a plurality of radio base stations at the same time, and may be referred to as "inter-base station carrier aggregation" (inter-eNB CA, inter-site CA, etc.). A CG is formed with a plurality of cells under the same radio base station, where a CG to include a PCell may be referred to as a "master CG" (MCG), and a CG not including a PCell may be referred to as a "secondary CG" (SCG).

Alternatively, a plurality of cells may be grouped in groups that are different from the above-described TAGs and CGs. For example, it may be possible to define new groups for resetting the individual TPC command-accumulated values of a plurality of cells all together.

Figure 5:
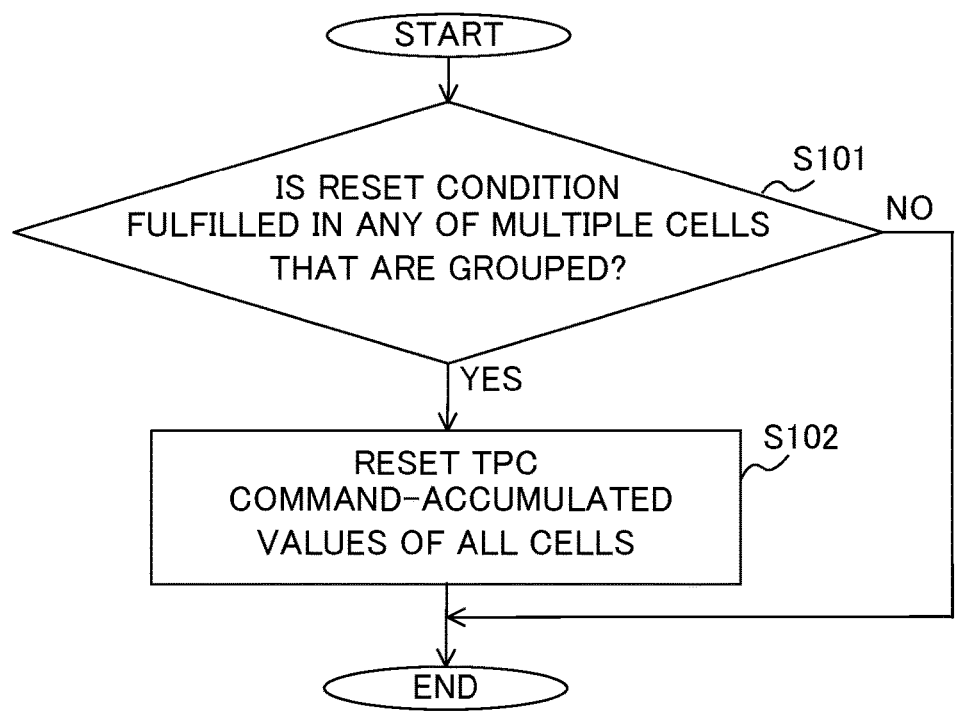
FIG. 5 is a diagram to explain an example of resetting TPC command-accumulated values according to the first aspect.

FIG. 5 is a diagram to explain an example of resetting TPC command-accumulated values according to the first aspect. Note that, although a case will be described with FIG. 5 where a plurality of cells are grouped into TAGs, this is by no means limiting. As described above, a plurality of cells may be grouped into CGs, or may be grouped into groups that are different from TAGs or CGs.

As shown in FIG. 5, a user terminal decides whether or not the reset condition is fulfilled in any of a plurality of cells that are grouped (step S101). When the reset condition is fulfilled in one of a plurality of cells that are grouped (step S101: Yes), the TPC command-accumulated values of all of a plurality of cells are reset (step S102).

For example, when the above-described first or second reset condition is fulfilled in the PCell in the pTAG of FIG. 4, the user terminal resets the TPC command-accumulated values of the PCell and the two SCells in the pTAG all together. Also, when the above-described first or second reset condition is fulfilled in one SCell in the sTAG of FIG. 4, the user terminal resets the TPC command-accumulated values of both SCells in the sTAG together.

Note that, although the above-described first or second reset condition is used as the reset condition here, this is by no means limiting. For example, the third to eighth reset conditions, which will be described later (second aspect), can be used as well.

In this way, with the radio communication method according to the first aspect, when the reset condition is fulfilled in one of a plurality cells that are grouped, the TPC command-accumulated values of all of these multiple cells are reset. That is, TPC command-accumulated values are reset on a per TAG basis, not on a per cell basis. Consequently, compared to the case of resetting TPC command-accumulated values on a per cell basis (FIG. 4), it is possible to simplify the procedures for resetting the TPC command-accumulated values of a plurality of cells, and reduce the signaling and delay time.

(Second Aspect)

Now, a radio communication method according to a second aspect will be described with reference to FIG. 6. Reset conditions other than the above-described first and second reset conditions will be described with the second aspect. The above-described first and second reset conditions necessitate RRC signaling, random access procedures and so on, which makes the process for fulfilling the first and second reset conditions complex. For this reason, there is a demand to introduce reset conditions that can be used in a simpler way. Here, third to eighth reset conditions that can be used in a simpler way than the above-described first and second reset conditions will be described below.

Note that the third to eighth reset conditions, which will be described below, may be used when resetting the TPC command-accumulated value of a single cell, or may be used when resetting the TPC command-accumulated values of a plurality of cells that are grouped. In the former case, when any of the third to eighth reset conditions is fulfilled in a given cell, this given cell's TPC command-accumulated value is reset. In the former case, when any of the third to eighth reset conditions is fulfilled in one of a plurality of cells that are grouped, the TPC command-accumulated values of all of the multiple cells are reset.

Also, the third to seventh reset conditions can be employed in both cells where frequency division duplex (FDD) mode is used and cells where time division duplex (TDD) mode is used. The eighth reset conditions can be employed in cells where TDD is used.

<Third Reset Condition>

The third reset condition is fulfilled when a user terminal receives a MAC control element (MAC CE: Medium Access Control Element) including command information (hereinafter referred to as "reset command information") to command resetting of TPC command-accumulated values. The MAC control element refers to control information for use in MAC layer control.

According to the third reset condition, a MAC control element to include reset command information is signaled from a radio base station to a user terminal. The user terminal, upon receiving the MAC control element including reset command information, resets TPC command-accumulated values.

According to the third reset condition, TPC command-accumulated value are reset, by way of MAC layer control, using a MAC control element for resetting TPC command-accumulated values. Consequently, TPC command-accumulated values can be reset with lower delays and less overhead than with the first and second reset conditions.

<Fourth Reset Condition>

The fourth reset condition is fulfilled when the transmission timing value represented by a timing advance (TA) command fulfills a predetermined condition (for example, exceeds a predetermined threshold value, becomes equal to or higher than a predetermined threshold value, and so on). A TA command is a command to represent uplink channel transmission timing value and is included in a MAC control element. The TA command is signaled from a radio base station to a user terminal in the MAC layer.

Figure 6A:
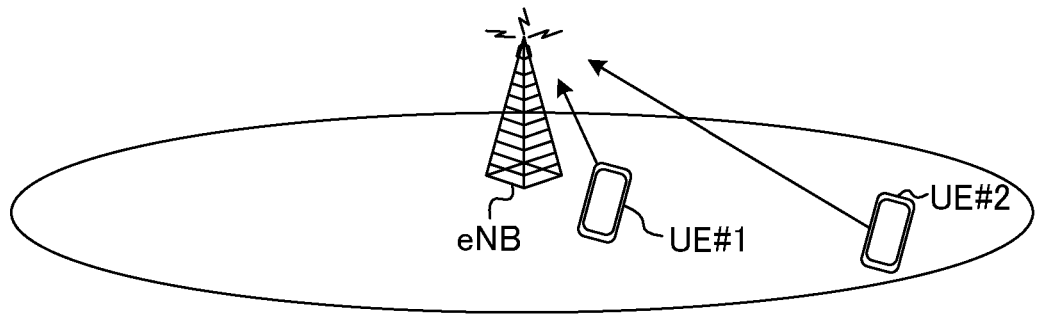
FIG. 6 provides diagrams to explain transmission timing values represented by TA commands.
Figure 6B:
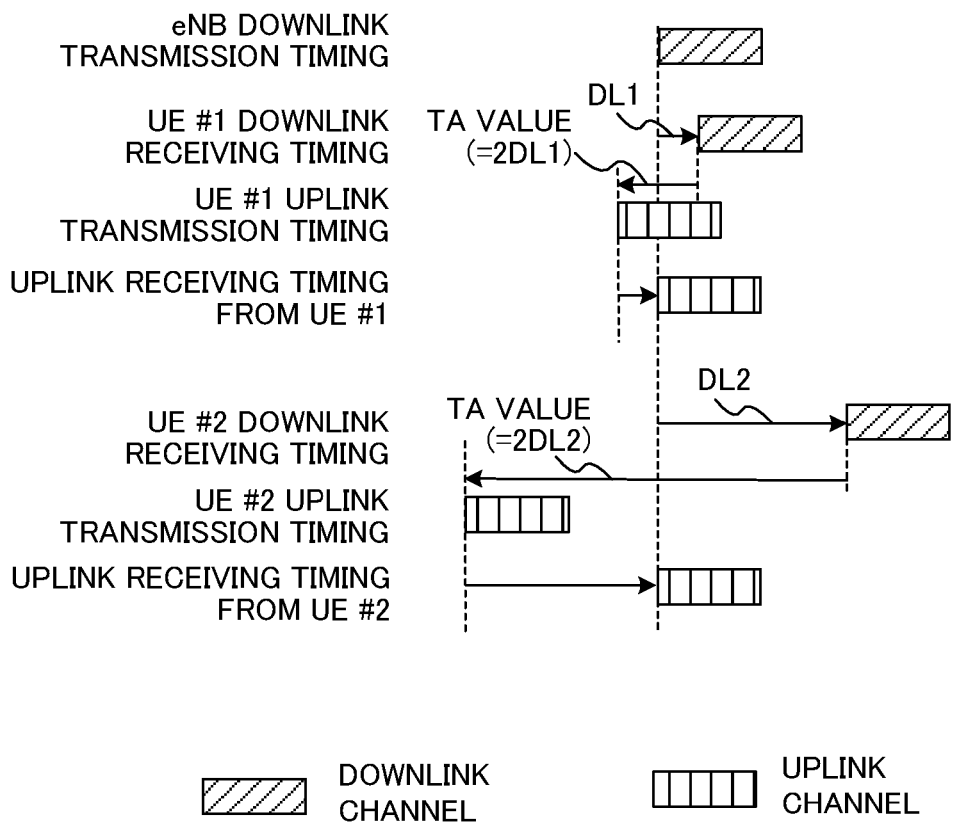

FIG. 6 provide diagrams to explain transmission timing values (hereinafter referred to as "TA values") represented by TA commands. FIG. 6A shows a case where a user terminal #1 is located in the center of the cell, and a user terminal #2 is located on the cell's edge. FIG. 6B shows the TA values of user terminals #1 and #2 in the case illustrated in FIG. 6A. Here, the TA values represent how much uplink channels are placed backward in time so that the uplink channels will arrive at the radio base station at desired timing.

Referring to FIG. 6B, the TA command that is reported from the radio base station to user terminal #1 represents a TA value (=2DL1) that is twice the downlink propagation delay time (DL1). User terminal #1 transmits an uplink channel at the transmission timing that is the TA value backward from the downlink receiving timing. Similarly, the TA command that is reported from the radio base station to user terminal #2 represents a TA value (=2DL2) that is twice the downlink propagation delay time (DL2). User terminal #2 transmits an uplink channel at the transmission timing that is the TA value backward from the downlink receiving timing.

In the case illustrated in FIG. 6B, given the uplink propagation delay time, which is estimated to be substantially equal to the downlink propagation delay time, the uplink channels from user terminals #1 and #2 arrive at the radio base station at the same timing. In this way, the radio base station can coordinate the receiving timings of uplink channels from a plurality of user terminals in different locations by designating TA values.

Here, if the TA values exceed a predetermined threshold value, the relationships between the user terminals and the radio base station in terms of their locations also change, and the uplink channel transmission power from the user terminals might also change as well. So, if the TA values exceed a predetermined threshold value, the user terminals reset the TPC command-accumulated values. By this means, TPC command-accumulated values can be reset in timings where the transmission power changes, so that it is possible to reduce the volume of signaling.

As described above, according to the fourth reset condition, TPC command-accumulated values are reset, by way of MAC layer control, based on TA values represented by TA commands included in MAC control elements. Consequently, it is not necessary to send signaling solely for resetting TPC command-accumulated values, so that it is possible to reduce the volume of signaling.

<Fifth Reset Condition>

The fifth reset condition is fulfilled when an SCell's TA timer expires. The TA timer (Timing Advance timer) is a timer to measure the time the above-noted MAC control elements to include TA commands are not received. When the TA timer expires (when the time counted on the TA timer continues a predetermined time or longer), uplink resources that are reserved for user terminals are released, and uplink channel transmission is stopped. Note that the TA timer is started (reset) every time the above-described TA command is received.

When an SCell's TA timer expires, a user terminal stops transmitting uplink channels in this SCell, so that uplink channel transmission power control is no longer necessary. So, when an SCell's TA timer expires, the user terminal resets this SCell's TPC command-accumulated value. In this way, the TPC command-accumulated value is reset in the timing when uplink channel transmission in the SCell is stopped, so that it is possible to reduce the volume of signaling.

As described above, according to the fifth reset condition, when a TA timer expires, TPC command-accumulated values are reset by way of MAC layer control. Consequently, it is not necessary to carry out signaling between a radio base station and a user terminal, so that it is possible to reduce the volume of signaling.

<Sixth Reset Condition>

The sixth reset condition is fulfilled when a user terminal receives command information that commands to de-activate SCells (hereinafter referred to as "de-activation command information"). The de-activation command information is included in MAC control elements, and is signaled from a radio base station to a user terminal in the MAC layer.

The user terminal, upon receiving de-activation command information for an SCell, stops transmitting uplink channels in that SCell, so that uplink channel transmission power control is no longer necessary. So, when de-activation command information for an SCell is received, the user terminal resets the SCell's TPC command-accumulated value. In this way, the TPC command-accumulated value is reset in the timing when uplink channel transmission in the SCell is stopped, so that it is possible to reduce the volume of signaling.

As described above, according to the sixth reset condition, when a MAC control element to include de-activation command information is received, TPC command-accumulated values are reset by way of MAC layer control. Consequently, it is not necessary to send signaling solely for resetting TPC command-accumulated values, so that it is possible to reduce the volume of signaling.

<Seventh Reset Condition>

The seventh reset condition is fulfilled when a user terminal receives DCI format 3 or 3A (hereinafter referred to as "DCI format 3/3A"). DCI format 3/3A is DCI that is used to transmit TPC commands for the PUCCH and PUSCH. DCI format 3 includes two-bit TPC commands, and DCI format 3A includes one-bit TPC commands. DCI format 3/3A is reported dynamically using a downlink control channels (PDCCH, EPDCCH and so on).

According to the seventh reset condition, resetting of TPC command-accumulated values may be commanded implicitly or explicitly. When a command is given implicitly, TPC command-accumulated values may be reset triggered by existing DCI format 3/3A. When a command is given explicitly, DCI format 3/3A may include command information to command resetting of TPC command-accumulated values, in addition to TPC commands.

As described above, according to the seventh condition, TPC command-accumulated values are reset, by way of physical layer control, using DCI format 3/3A communicated in downlink control channels (PDCCH, EPDCCH and so on). Consequently, TPC command-accumulated values can be reset with lower delays (for example, with delays of approximately 4 ms) than with the first and second reset conditions, and than with the third, fourth, fifth and sixth reset conditions.

<Eighth Reset Condition>

The eighth reset condition is fulfilled when command information to command switching the UL-DL configuration (which will be described later with reference to FIG. 7) is received in a cell in time division duplex mode (TDD) (hereinafter referred to as "switch command information").

The switch command information is included in DCI that is communicated in downlink control channels (PDCCH, EPDCCH and so on).

The user terminal switches the UL-DL configuration depending on reception of DCI including switch command information. When the UL-DL configuration is switched, it is likely that inter-cell interference will also vary and the transmission power control will change. So, when DCI to include switch command information is received, the user terminal resets the TPC command-accumulated values.

As described above, according to the eighth reset condition, if UL-DL configuration switch command information is received in a cell in TDD, the TPC command-accumulated value is reset by way of physical layer control. Consequently, it is not necessary to send signaling solely for resetting TPC command-accumulated values, so that it is possible to reduce the volume of signaling.

(Third Aspect)

Now, a radio communication control method according to the third aspect will be described with reference to FIGS. 7 to 12. With the third aspect, when, in a cell of TDD, transmission power control is executed per subframe set that is provided in a radio frame, each subframe set's TPC command-accumulated value can be reset.

Note that the radio communication method according to the third aspect, although applied to a single cell in the case described below, can be applied to a plurality of cells as well. As has been described earlier with the first aspect, when the radio communication method according to the third aspect is applied to a plurality of cells and the reset condition is fulfilled in at least one of the multiple cells, the TPC command-accumulated values of the multiple cells can be reset all together. Also, as for the condition for resetting the TPC command-accumulated values, it is possible to use the above-described first and second reset conditions, or use the third to eighth reset conditions that have been described with the second aspect.

Figure 7:
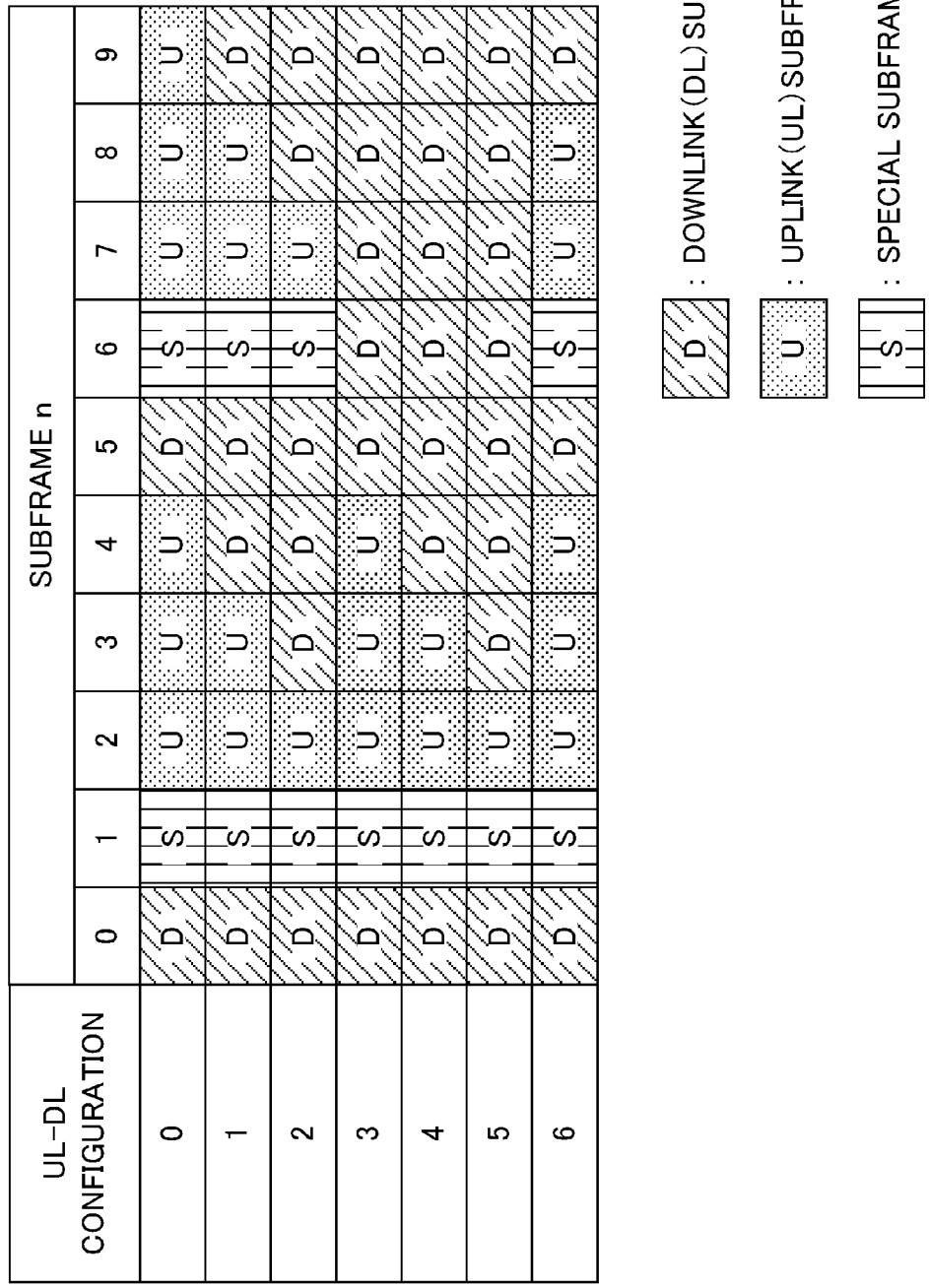
FIG. 7 is a diagram to explain UL-DL configurations in TDD.

FIG. 7 is a diagram to explain UL-DL configurations in TDD. The UL-DL configurations (Uplink (UL)/Downlink (DL) configurations, hereinafter also referred to as "uplink/downlink configurations") represent the configurations (ratios) of uplink subframes and downlink subframes in a radio frame. For example, FIG. 7 shows seven UL-DL configurations 0 to 6, with varying configurations (ratios) of uplink subframes and downlink subframes. Note that the UL-DL configurations shown in FIG. 7 are simply examples, and are by no means limiting.

Also, referring to FIG. 7, a special subframe is a subframe for switching a downlink subframe and an uplink subframe, and includes a downlink OFDM symbol, an uplink OFDM symbol, and an OFDM symbol for a guard period. A guard period is provided so as to prevent downlink symbols and uplink symbols from overlapping each other (coming up at the same time) when a user terminal makes an uplink transmission timing earlier with respect to a downlink receiving timing based on a TA command from a radio base station.

Generally speaking, the uplink traffic and the downlink traffic in a cell are asymmetrical and vary over time, between locations, and so on. Furthermore, when small cells with a small cell radius are introduced, the number of users which a radio base station communicates with at the same time becomes relatively small, so that it may be possible that the uplink and downlink traffic ratio to be demanded varies in a dynamic manner. Consequently, in cells using TDD, dynamic TDD is being studied to be introduced in order to achieve traffic adaptive gain. Dynamic TDD refers to a method of switching the UL-DL configurations shown in FIG. 7 dynamically. In existing TDD, UL-DL configurations are reported from a radio base station to a user terminal via broadcast information such as MIBs and SIB s, via higher layer signaling such as RRC signaling, and so on. However, there is a problem with signaling like these that the switching delay is significant, the overhead increases, and so on. So, in dynamic TDD, a method of switching UL-DL configurations by means of signaling of lower layers than the MAC layer and physical layer is under study.

Meanwhile, in dynamic TDD, when different UL/DL configurations are used between neighboring cells (radio base stations), inter-cell interference may be produced in subframes where the direction of communication varies between these radio base stations. Consequently, a study is in progress to execute different transmission power control (in particular, closed-loop control) between subframes where the direction of communication is the same between the cells and subframes where the direction of communication varies between the cells.

Figure 8:
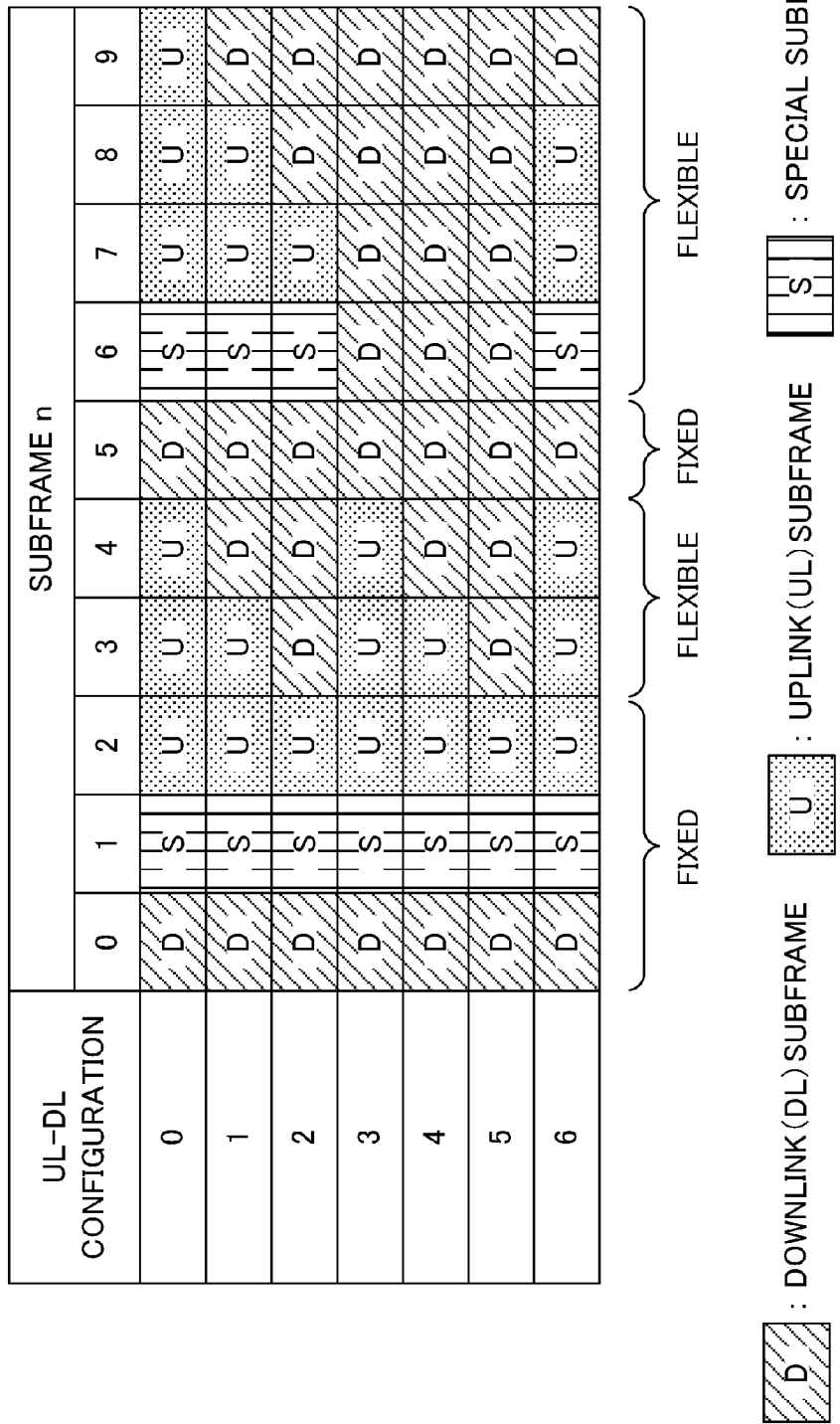
FIG. 8 is a diagram to explain fixed subframes and flexible subframes in TDD.

FIG. 8 is a diagram to explain fixed subframes and flexible subframes in TDD. As shown in FIG. 8, fixed subframes refer to subframes where the direction of communication is the same between UL-DL configurations 0 to 6 (subframes of the same frame type (U/D/S in FIG. 8)). Flexible subframes refer to subframes where the direction of communication varies between UL-DL configurations 0 to 6 (subframes of varying subframe types (U/D/S in FIG. 8)).

Note that the division between fixed subframes and flexible subframes in FIG. 8 is simply an example, and this is by no means limiting. For example, when the special subframes are seen as downlink subframes, subframe 6 may be handled as a fixed subframe.

FIG. 9 provide diagrams to explain inter-cell interference in dynamic TDD. FIG. 9A and FIG. 9B show fixed subframes, and FIG. 9C and FIG. 9D show flexible subframes.

Figure 9A:
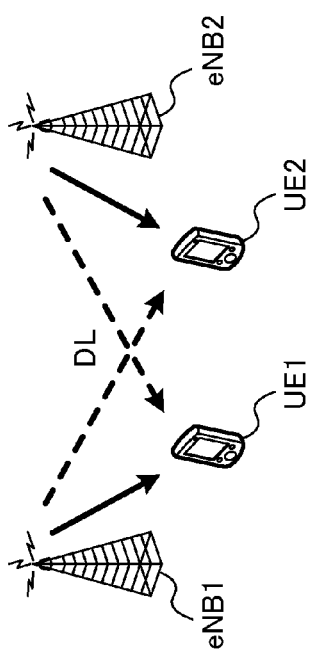
FIG. 9 provides diagrams to explain inter-cell interference in dynamic TDD.

In FIG. 9A, downlink communication is carried out between neighboring radio base stations 1 and 2 (cells 1 and 2). In the case illustrated in FIG. 9A, in user terminal 1, the impact of downlink interference signals from radio base station 2 is relatively small. Similarly, in user terminal 2, the impact of downlink interference signals from radio base station 1 is relatively small. Also, in FIG. 9B, uplink communication is carried out between neighboring radio base stations 1 and 2 (cells 1 and 2). In the case illustrated in FIG. 9B, in radio base station 1, the impact of uplink interference signals from user terminal 2 is relatively small. Similarly, in radio base station 2, the impact of uplink interference signals from user terminal 1 is relatively small.

Figure 9B:
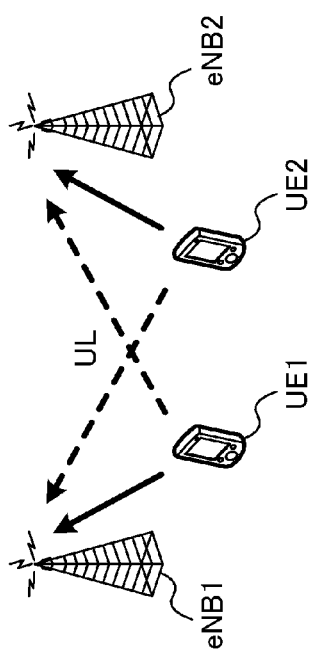
Figure 9C:
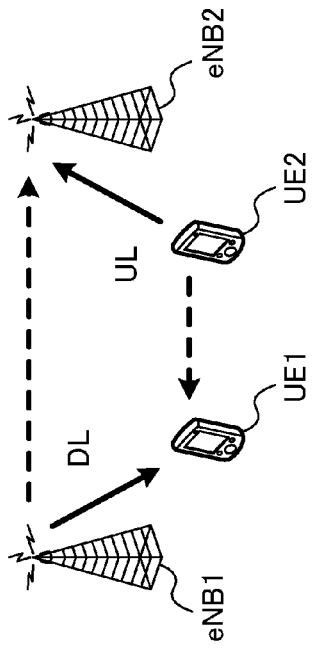

On the other hand, in FIG. 9C, downlink communication is carried out in radio base station 1 (cell 1), and uplink communication is carried out in radio base station 2 (cell 2). Generally speaking, the transmission power used in downlink communication is greater than the transmission power used in uplink communication. Consequently, in the case illustrated in FIG. 9C, in radio base station 2, the impact of downlink interference signals from radio base station 1 is relatively large. Also, in FIG. 9D, uplink communication is carried out in radio base station 1 (cell 1), and downlink communication is carried out in radio base station 2 (cell 2). In the case illustrated in FIG. 9D, in radio base station 1, the impact of downlink interference signals in radio base station 2 is relatively large.

As described above, in the flexible subframes shown in FIGS. 9C and 9D, the impact of inter-cell interference is large compared to the fixed subframes shown in FIGS. 9A and 9B. Consequently, it is desirable to apply different transmission power control (in particular, closed-loop control) between flexible subframes and fixed subframes.

So, when dynamic TDD is employed in a cell of TDD, a radio frame is divided into a plurality of subframe sets, and, in each subframe set, independent transmission power control (in particular, closed-loop control) is carried out. FIG. 10 provide diagrams to explain transmission power control in each subframe set.

Note that, although cases where two subframe sets are provided will be described with FIG. 10, the number of subframe sets is not limited to two and can be three or more. Also, the subframe sets are by no means limited to subframes sets that are formed with fixed/flexible subframes, and may be subframe sets that are formed with arbitrary subframes (for example, in FIG. 8, the subframe set formed with subframes 0 to 4, the subframe set formed with subframes 5 to 9 and so on). Also, two subframe sets do not necessarily have to be fixed subframes and flexible subframes. For example, it is possible to select a first subframe set and a second subframe set, in free combinations, from subframes where uplink transmission is possible. Furthermore, the first subframe set and the second subframe set may be configured in an overlapping manner (for example the first subframe set includes part or the whole of the second subframe set (or the other way around)). By this means, it is possible to use subframe sets in, for example, inter-base station coordination communication (CoMP) and so on, apart from dynamic TDD. For ease of explanation, a case will be described below in which two subframe sets are configured with fixed subframes and flexible subframes.

In FIG. 10, a radio frame is divided into a fixed subframe set (first subframe set), which is formed with fixed subframes (for example, subframes 0 to 2 and 5 in FIG. 8), and a flexible subframe set (second subframe set), which is formed with flexible subframes (for example, subframes 3, 4 and 6 to 9 in FIG. 8). In this case, a TPC command for the fixed subframe set (hereinafter referred to as "fixed TPC command") and a TPC command for the flexible subframe set (hereinafter referred to as "flexible TPC command") are provided, both providing individual transmission power control.

Figure 10A:
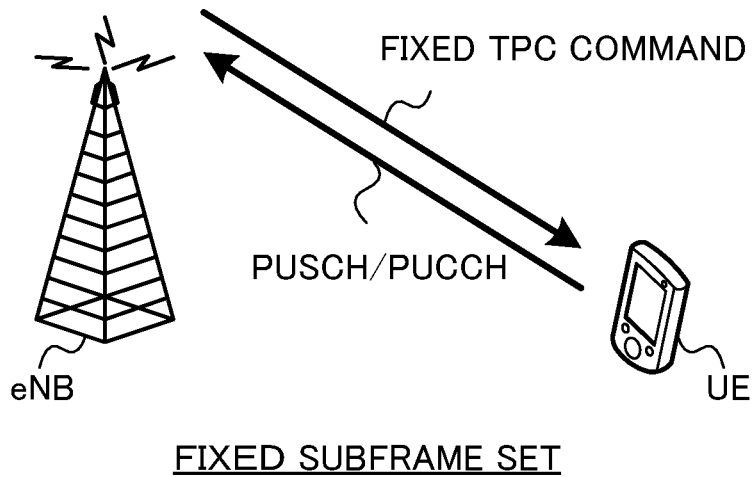
FIG. 10 provides diagrams to explain transmission power control for each subframe set.

For example, as shown in FIG. 10A, in the fixed subframe set, the radio base station transmits DCIs to include fixed TPC commands to the user terminal. The user terminal accumulates the increase/decrease values of transmission power represented by fixed TPC commands by using above equation 2. The accumulated value of the increase/decrease values represented by fixed TPC commands (hereinafter referred to as "fixed TPC command-accumulated value") may be denoted as $f_c\_A(i)$, for example. The user terminal controls the transmission power of uplink channels (PUSCH/PUCCH) in the fixed subframe set based on the fixed TPC command-accumulated value, by using, for example, above equation 1.

Figure 10B:
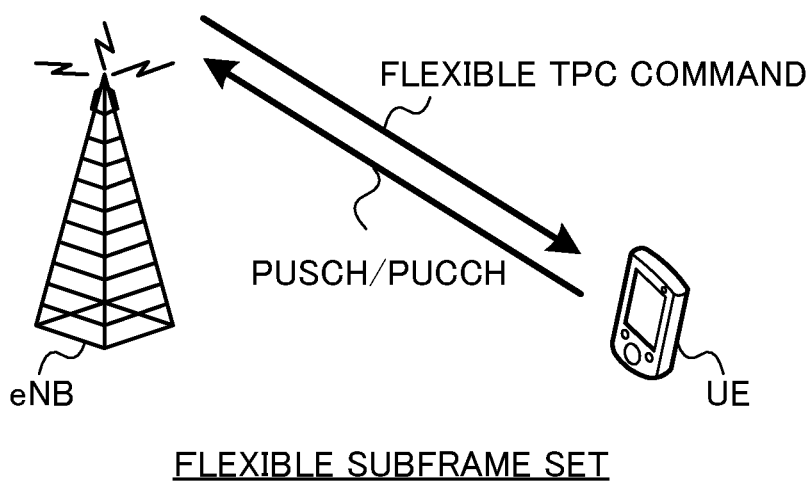

Also, as shown in FIG. 10B, in the flexible subframe set, the radio base station transmits DCIs to include flexible TPC commands to the user terminal. The user terminal accumulates the increase/decrease values of transmission power represented by flexible TPC commands by using above equation 2 The accumulated value of the increase/decrease values represented by flexible TPC commands (hereinafter referred to as "flexible TPC command-accumulated value") may be denoted as $f_c\_B(i)$, for example. The user terminal controls the transmission power of uplink channels (PUSCH/PUCCH) in the flexible subframe set based on the flexible TPC command-accumulated value, by using, for example, above equation 1.

As described above, when transmission power control is executed on a per subframe set basis, different TPC command-accumulated values are used on a per subframe set basis. Consequently, it is necessary to reset each subframe set's TPC command-accumulated value.

FIG. 11 provide diagrams to explain an example of resetting the TPC command-accumulated value of each subframe set. Note that, although a case will be described below where the above-described fixed subframe set and flexible subframe set are provided, this is by no means limiting, as noted earlier.

Figure 11A:
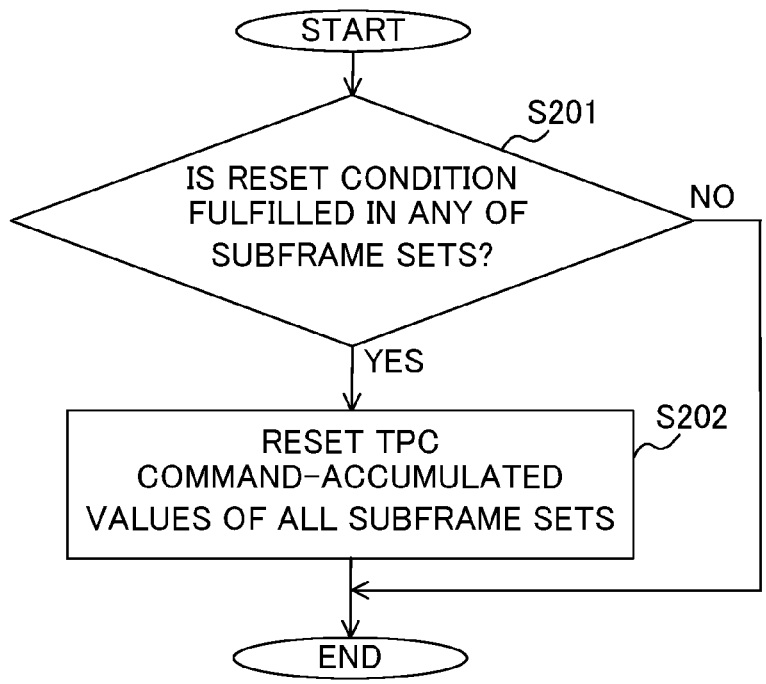
FIG. 11 provides diagrams to explain examples of resetting TPC command-accumulated values according to the third aspect.

FIG. 11A shows the first example of resetting TPC command-accumulated value of each subframe set. As shown in FIG. 11A, in the first reset example, a user terminal decides whether or not the reset condition is fulfilled in either the fixed subframe set or the flexible subframe set (step S201). For the reset condition, the above-described first to eighth reset conditions may be used.

When the reset condition is fulfilled in one of the fixed subframe set and the flexible subframe set (step S201: Yes), the user terminal resets the TPC command-accumulated values of both the fixed subframe set and the flexible subframe set (step S202).

In this way, in the first reset example of FIG. 11A, when the reset condition is fulfilled in one of the subframe sets, the TPC command-accumulated values of all subframe sets are reset. Consequently, when, for example, a gap in synchronization is produced or communication is resumed in one subframe set (for example, when the above-described second reset condition is fulfilled in one subframe set), each subframe set's transmission power can be controlled adequately.

Figure 11B:
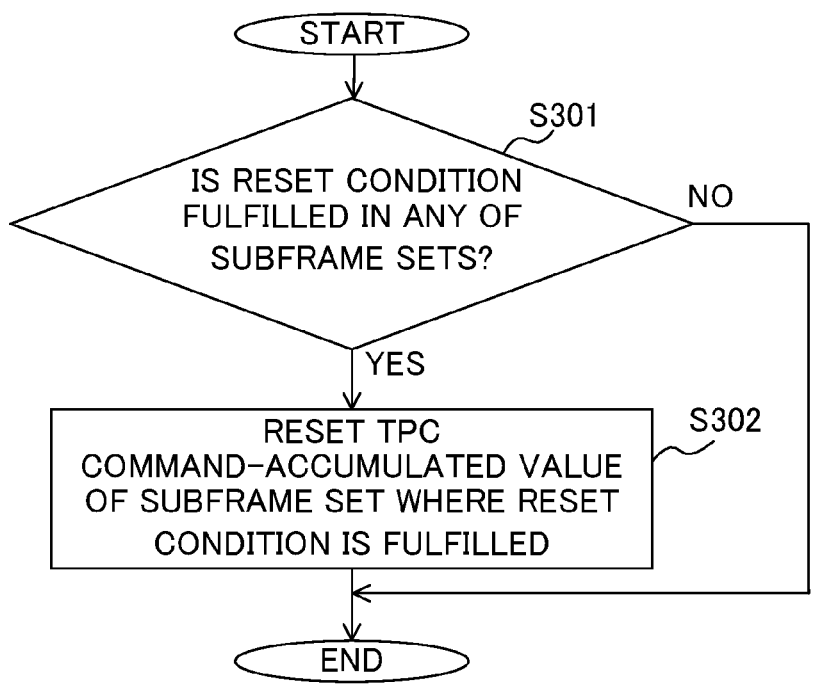

FIG. 11B shows the second example of resetting TPC command-accumulated value of each subframe set. As shown in FIG. 11B, in the second reset example, a user terminal decides whether or not the reset condition is fulfilled in either the fixed subframe set or the flexible subframe set (step S301). For the reset condition, the above-described first to eighth reset conditions may be used, but the first reset condition is preferable.

When the reset condition is fulfilled in one of the fixed subframe set and the flexible subframe set (step S301: Yes), a user terminal resets the TPC command-accumulated value of the subframe set fulfilling the reset condition (step S302).

In this way, in the second reset example of FIG. 11B, when the reset condition is fulfilled in one of the subframe sets, the TPC command-accumulated value of the subframe set fulfilling the reset condition is reset. Consequently, the TPC command-accumulated values of unaffected subframe set are maintained without being reset, thus avoiding unnecessary process.

Figure 12:
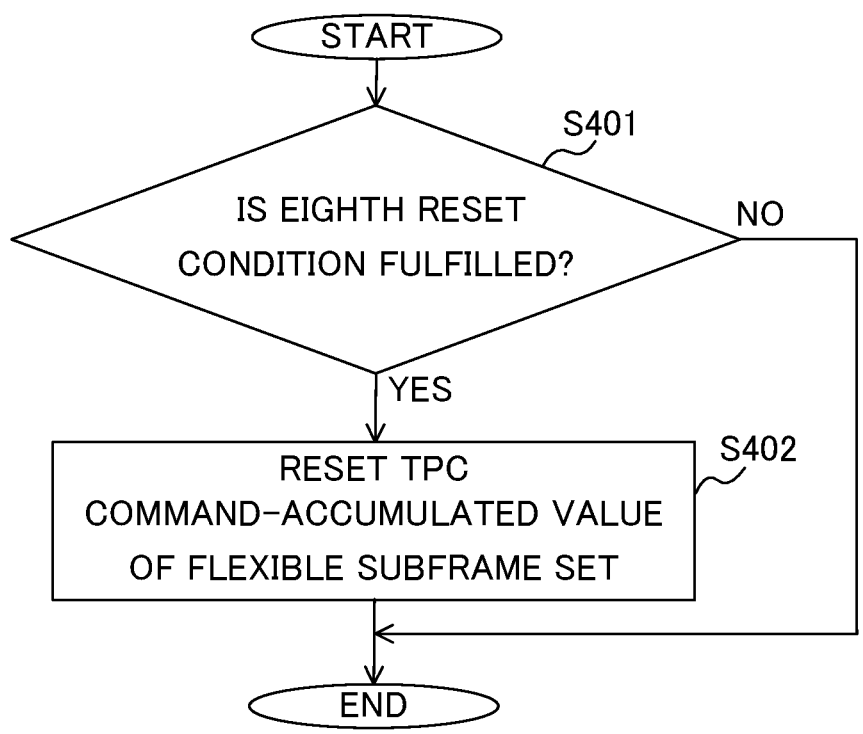
FIG. 12 is diagram to explain another example of resetting TPC command-accumulated values according to the third aspect.

FIG. 12 is diagram to explain another example of resetting TPC command-accumulated value on a per subframe set basis. In FIG. 12, different reset conditions are used on a per subframe set basis. For example, the above-described first or the second reset condition is used in the fixed subframe set, and the above-described eighth reset condition is used in the flexible subframe set.

As shown in FIG. 12, a user terminal decides whether the eighth reset condition is fulfilled (that is, whether or not UL-DL configuration switch command information is received) (step S401). When the eighth reset condition is fulfilled (step S401: Yes), the user terminal resets the TPC command-accumulated value of the flexible subframe set (step S402).

In FIG. 12, when a command to switch the UL-DL configuration is given, the TPC command-accumulated value of the fixed subframe set is not reset, and only the TPC command-accumulated value of the flexible subframe set is reset. Consequently, in the fixed subframe set that is unaffected by the switch of the UL-DL configuration, it is possible to prevent the TPC command-accumulated value from being reset.

With the above radio communication method according to the third aspect, it is possible to adequately reset TPC command-accumulated values even when transmission power is controlled on a per subframe basis.

Note that although, with FIGS. 11 and 12, the TPC command-accumulated values of subframe sets have been described to be reset to the initial values (for example, 0), this is by no means limiting. For example, it may be possible to reset the TPC command-accumulated value of the fixed subframe set to the initial value, and replace the TPC command-accumulated value of the flexible subframe set with the TPC command-accumulated value of the fixed subframe set.

Figure 9D:
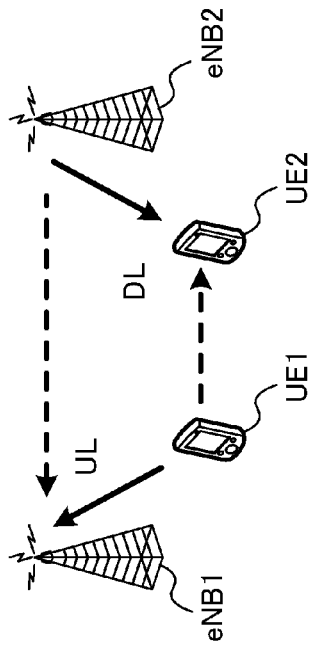

In this case, it is possible to control the uplink channel transmission power of the flexible subframe set by using the uplink channel transmission power of the fixed subframe set as a base line, and execute more aggressive transmission power control in the flexible subframe set. To be more specific, it may be possible to control fixed subframes to have greater transmission power, considering the possibility that relatively severe interference might come from neighboring cells, as shown in FIGS. 9C and 9D. Also, when the transmission power of the flexible subframe set becomes excessive or runs short, it is possible to resume the transmission power of the fixed subframe set by means of a reset command. Flexible subframes are more likely to be controlled to have greater transmission power as noted earlier, so that, by introducing simple accumulated value reset conditions, it is possible to achieve an effect of reducing unwanted neighboring-cell interference. Also, when the TPC command-accumulated value of the flexible subframe set is replaced with the TPC command-accumulated value of the fixed subframe set by means of a reset command, the transmission power that has been reset has only to be replaced with a proper TPC command-accumulated value for fixed subframes, so that it is easy to continue communication compared to the case of replacing with a zero.

(Structure of Radio Communication System)

Now, a structure of a radio communication system according to the present embodiment will be described below. In this radio communication system, the above-described radio communication methods according to the first to third aspects are employed. Note that the radio communication methods according to the first to third aspects may be employed in combination or may be employed independently.

Figure 13:
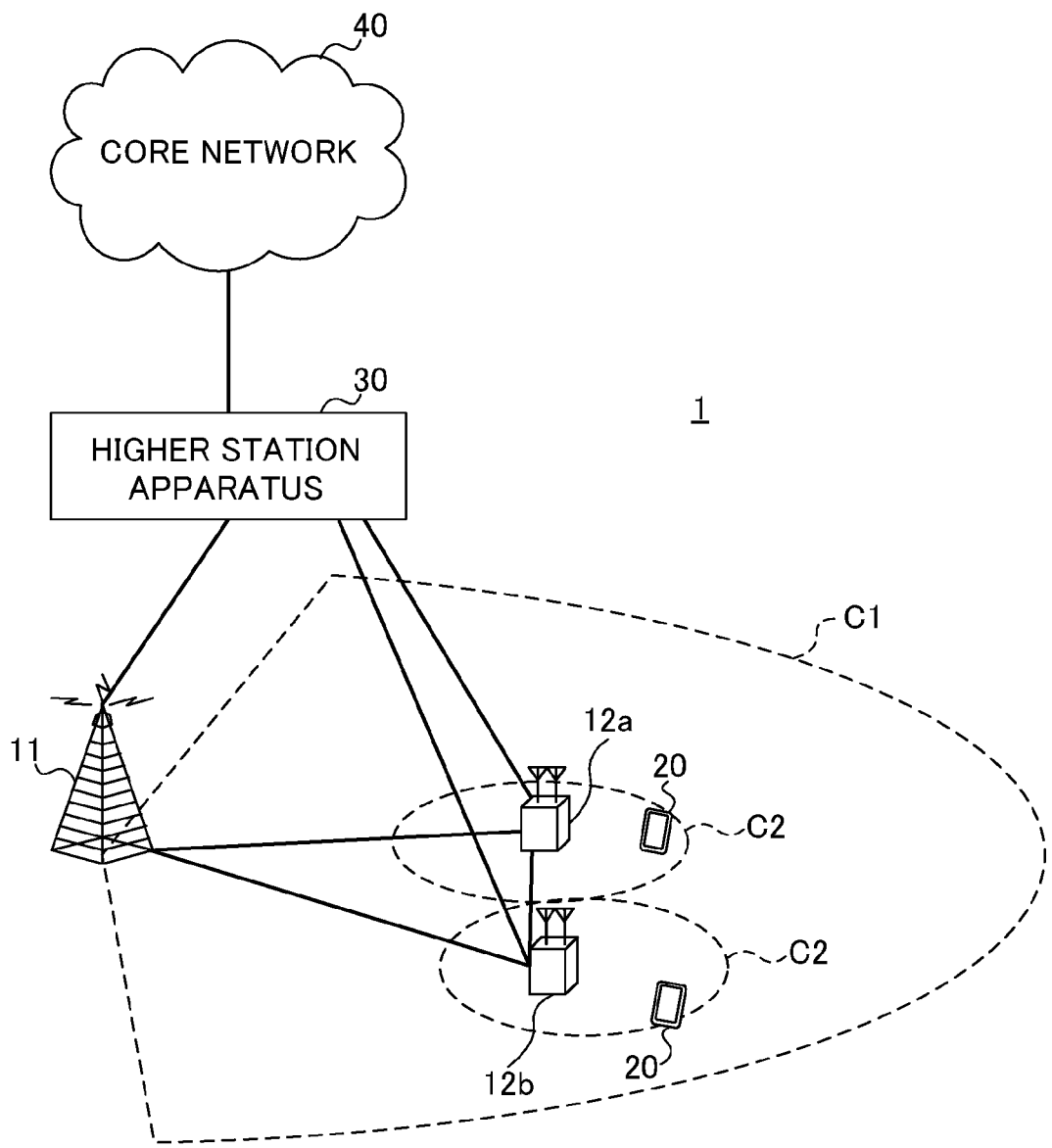
FIG. 13 is a schematic diagram to show an example of a radio communication system according to the present embodiment.

FIG. 13 is a schematic structure diagram of the radio communication system according to the present embodiment. As shown in FIG. 13, the radio communication system 1 includes a macro base station 11, which forms a macro cell C1, and small base stations 12a and 12b, which are placed in the macro cell C1 and which form small cells C2 that are narrower than the macro cell C1. The user terminals 20 are configured to be capable of carrying out radio communication with at least one of the macro base station 11 and the small base stations 12a and 12b (hereinafter collectively referred to as "small base stations 12"). Note that the numbers of macro base stations 11 and small base stations 12 are not limited to those illustrated in FIG. 13.

The macro cell C1 and the small cells C2 may use the same frequency band or may use different frequency bands.

The macro base station 11 and the small base stations 12 may be connected via a relatively high-speed channel (ideal backhaul) such as optical fiber, or may be connected via a relatively low-speed channel (non-ideal backhaul) such as the X2 interface.

In the event connection is established with a relatively high-speed channel, the small base stations 12 may carry out intra-base station carrier aggregation (intra-eNB CA) to aggregate at least one CC of the macro base station 11 and at least one CC of the small base stations 12. In the event connection is established using a relatively low-speed channel, the macro base station 11 and the small base stations 12 may carry out inter-base station carrier aggregation (inter-eNB CA) between at least one CC of the macro base station 11 and at least one CC of the small base stations 12. Note that a CC may be referred to as a cell, a frequency band and so on.

The macro base station 11 and the small base stations 12 are each connected to a higher station apparatus 30, and are connected to a core network 40 via the higher station apparatus 30. Note that the higher station apparatus 30 may be, for example, an access gateway apparatus, a radio network controller (RNC), a mobility management entity (MME) and so on, but is by no means limited to these.

Note that the macro base station 11 is a radio base station having a relatively wide coverage, and may be referred to as an "eNodeB (eNB)," a "radio base station," a "transmission point" and so on. The small base stations 12 are radio base stations that have local coverages, and may be referred to as "RRHs (Remote Radio Heads)," "pico base stations," "femto base stations," "home eNodeBs," "transmission points," "eNodeBs (eNBs)" and so on. The user terminals 20 are terminals to support various communication schemes such as LTE, LTE-A and so on, and may include both mobile communication terminals and stationary communication terminals.

In the radio communication system 1, frequency division duplex (FDD) and/or time division duplex (TDD) is employed as duplex mode. Also, when TDD is employed, UL-DL configurations (see FIG. 7) are used, which show the configurations (ratios) of uplink subframe and downlink subframes in a radio frame.

In the radio communication system 1, as radio access schemes, OFDMA (Orthogonal Frequency Division Multiple Access) is applied to the downlink, and SC-FDMA (Single-Carrier Frequency Division Multiple Access) is applied to the uplink.

Also, in the radio communication system 1, a downlink shared channel (PDSCH: Physical Downlink Shared Channel), which is used by each user terminal 20 on a shared basis, downlink control channels (PDCCH: Physical Downlink Control Channel, EPDCCH: Enhanced Physical Downlink Control Channel, PCFICH, PHICH, broadcast channel (PBCH), etc.), and so on are used as downlink communication channels. User data and higher layer control information are communicated by the PDSCH. Downlink control information (DCI) is communicated by the PDCCH and the EPDCCH.

Also, in the radio communication system 1, an uplink shared channel (PUSCH: Physical Uplink Shared Channel), which is used by each user terminal 20 on a shared basis, and an uplink control channel (PUCCH: Physical Uplink Control Channel) are used as uplink communication channels. User data and higher layer control information are communicated by the PUSCH. Also, downlink radio quality information (CQI: Channel Quality Indicator), delivery acknowledgment information (ACK/NACK) and so on are communicated by the PUCCH.

Hereinafter, the macro base station 11 and the small base stations 12 will be collectively referred to as "radio base station 10," unless specified otherwise. Note that the radio communication methods according to the first to third aspects may be employed in a single or a plurality of macro base stations 11, may be employed in a single or a plurality of small base stations 12, or may be employed between macro base stations 11 and small base stations 12.

Figure 14:
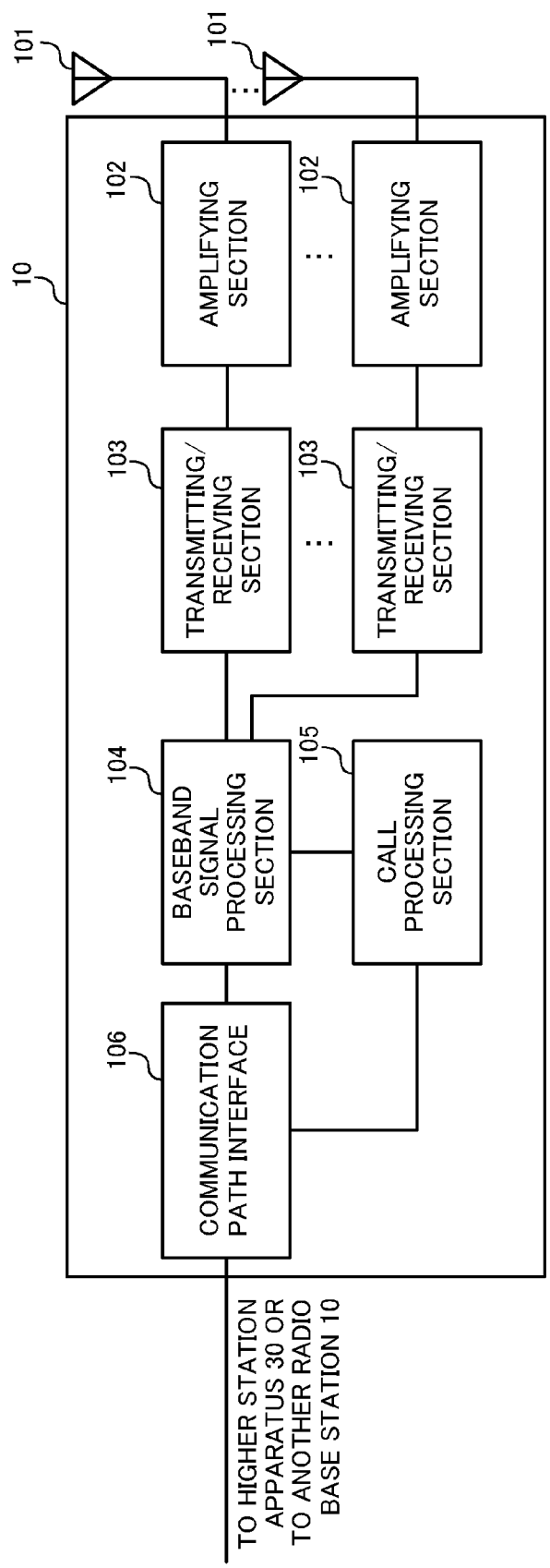
FIG. 14 is a diagram to explain an overall structure of a radio base station according to the present embodiment.

Now, overall structures of a radio base station 10 and a user terminal 20 according to the present embodiment will be described with reference to FIGS. 14 and 15. FIG. 14 is a diagram to show an overall structure of a radio base station 10 according to the present embodiment. The radio base station 10 has a plurality of transmitting/receiving antennas 101 for MIMO communication, amplifying sections 102, transmitting/receiving sections (transmitting section and receiving section) 103, a baseband signal processing section 104, a call processing section 105, and a transmission path interface 106.

User data to be transmitted from the radio base station 10 to the user terminals 20 on the downlink is input from the higher station apparatus 30, into the baseband signal processing section 104, via the communication path interface 106.

In the baseband signal processing section 104, a PDCP layer process, division and coupling of user data, RLC (Radio Link Control) layer transmission processes such as an RLC retransmission control transmission process, MAC (Medium Access Control) retransmission control, including, for example, an HARQ transmission process, scheduling, transport format selection, channel coding, an inverse fast Fourier transform (IFFT) process and a precoding process are performed, and the result is forwarded to each transmitting/receiving section 103. Furthermore, downlink control signals are also subjected to transmission processes such as channel coding and an inverse fast Fourier transform, and are transferred to each transmitting/receiving section 103.

Each transmitting/receiving section 103 converts the downlink signals, pre-coded and output from the baseband signal processing section 104 on a per antenna basis, into a radio frequency band. The amplifying sections 102 amplify the radio frequency signals having been subjected to frequency conversion, and transmit the signals through the transmitting/receiving antennas 101.

On the other hand, as for the uplink signals, radio frequency signals that are received in the transmitting/receiving antennas 101 are each amplified in the amplifying sections 102, converted into the baseband signal through frequency conversion in each transmitting/receiving section 103, and input into the baseband signal processing section 104.

In the baseband signal processing section 104, user data that is included in the input uplink signals is subjected to an FFT process, an IDFT process, error correction decoding, a MAC retransmission control receiving process, and RLC layer and PDCP layer receiving processes, and forwarded to the higher station apparatus 30 via the communication path interface 106. The call processing section 105 performs call processing such as setting up and releasing communication channels, manages the state of the radio base stations 10 and manages the radio resources.

Figure 15:
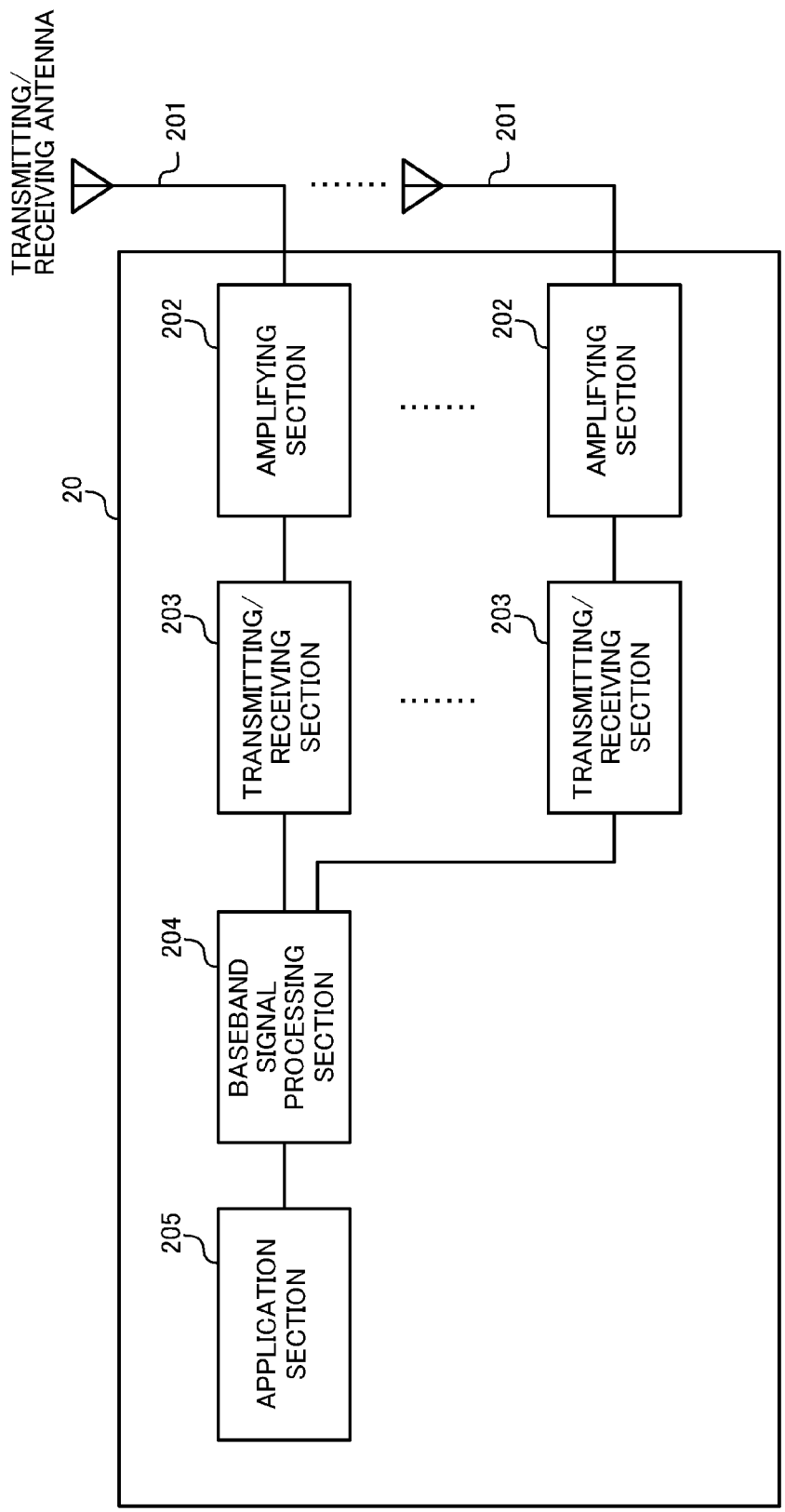
FIG. 15 is a diagram to explain an overall structure of a user terminal according to the present embodiment.

FIG. 15 is a diagram to show an overall structure of a user terminal 20 according to the present embodiment. The user terminal 20 has a plurality of transmitting/receiving antennas 201 for MIMO communication, amplifying sections 202, transmitting/receiving sections (receiving section and transmitting section) 203, a baseband signal processing section 204 and an application section 205. Note that the user terminal 20 may switch the receiving frequency using one receiving circuit (RF circuit), or may have a plurality of receiving circuits.

As for downlink signals, radio frequency signals that are received in a plurality of transmitting/receiving antennas 201 are each amplified in the amplifying sections 202, subjected to frequency conversion in the transmitting/receiving sections 203, and input in the baseband signal processing section 204. In the baseband signal processing section 204, an FFT process, error correction decoding, a retransmission control receiving process and so on are performed. The user data that is included in this downlink signal is forwarded to the application section 205. The application section 205 performs processes related to higher layers above the physical layer and the MAC layer. Furthermore, in the downlink data, broadcast information is also forwarded to the application section 205.

Meanwhile, uplink user data is input from the application section 205 to the baseband signal processing section 204. In the baseband signal processing section 204, a retransmission control (H-ARQ (Hybrid ARQ)) transmission process, channel coding, precoding, a DFT process, an IFFT process and so on are performed, and the result is forwarded to each transmitting/receiving section 203. The baseband signal that is output from the baseband signal processing section 204 is converted into a radio frequency band in the transmitting/receiving section 203. After that, the amplifying sections 202 amplify the radio frequency signal having been subjected to frequency conversion, and transmit the resulting signal from the transmitting/receiving antennas 201.

Figure 16:
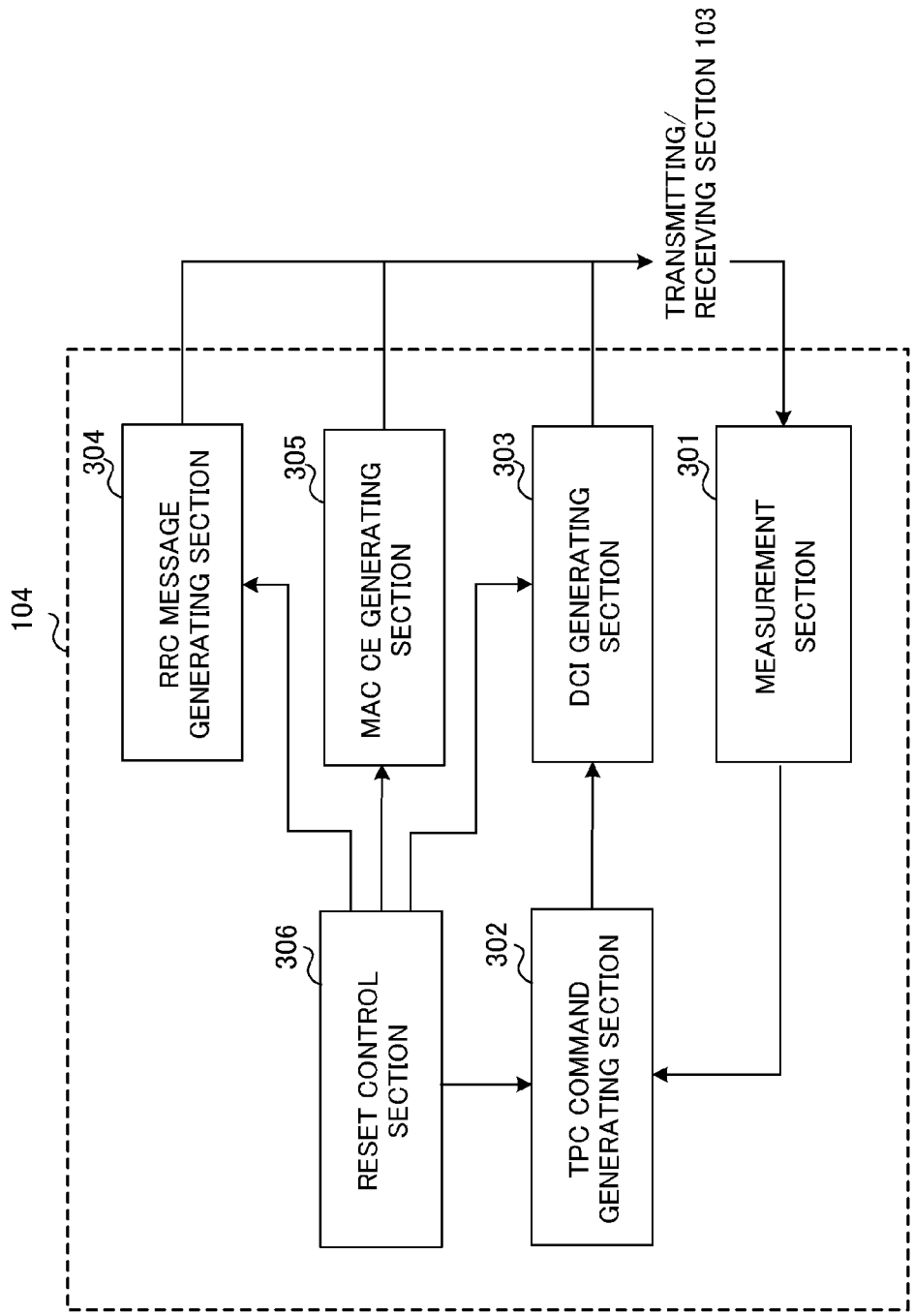
FIG. 16 is a diagram to explain a detailed structure of a radio base station according to the present embodiment.
Figure 17:
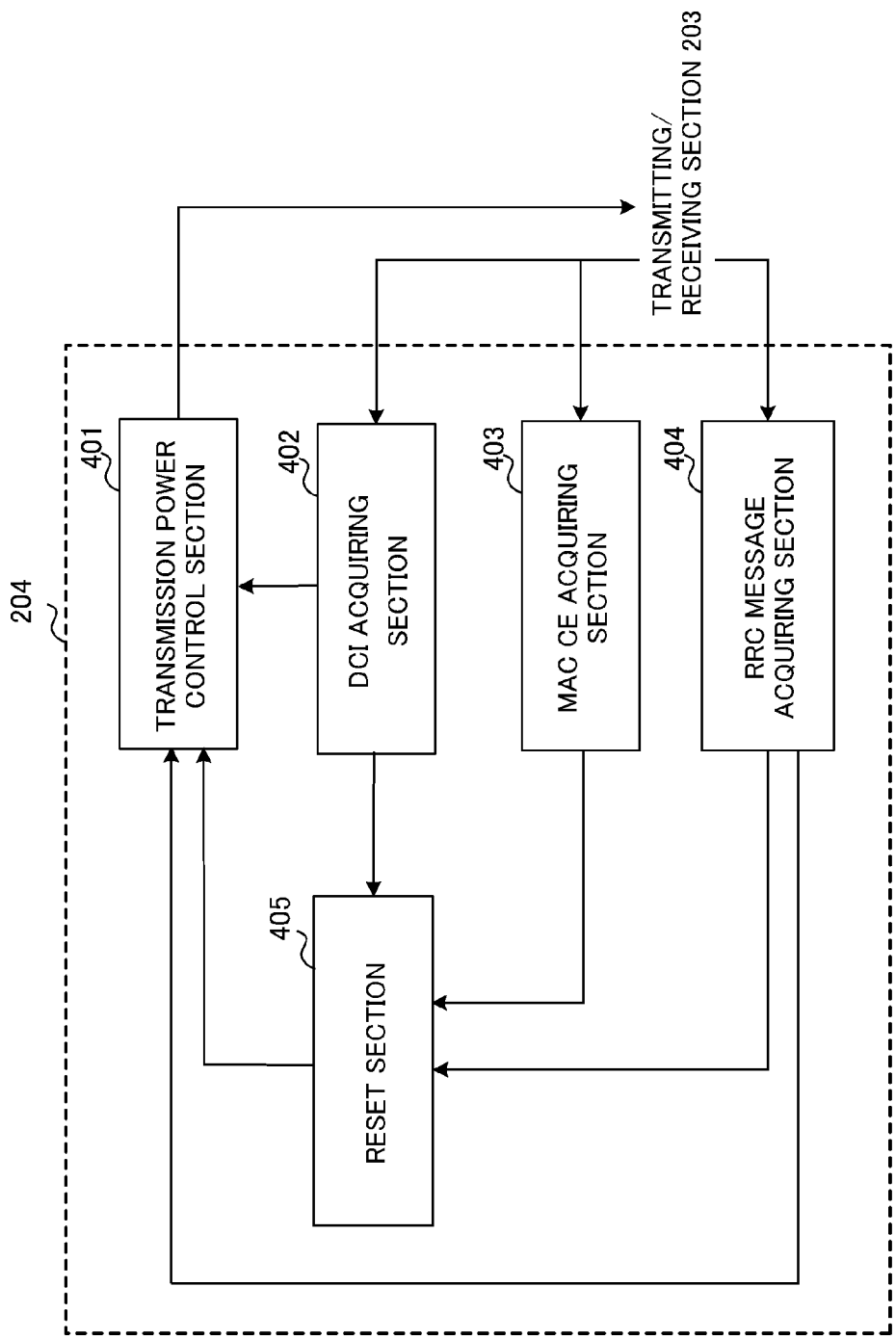
FIG. 17 is a diagram to explain a detailed structure of a user terminal according to the present embodiment.

Next, detailed structures of the radio base station 10 and the user terminal 20 will be described below with reference to FIGS. 16 and 17. The detailed structure of the radio base station 11 shown in FIG. 16 is primarily formed with the baseband signal processing section 104. Also, the detailed structure of the user terminal 20 shown in FIG. 17 is primarily formed with the baseband signal processing section 204.

FIG. 16 is a diagram to show a detailed structure of a radio base station 10 according to the present embodiment. As shown in FIG. 16, the radio base station 10 has a measurement section 301, a TPC command generating section 302, a DCI generating section 303, an RRC message generating section 304, a MAC CE generating section 305 and a reset control section 306.

The measurement section 301 measures the received quality (for example, RSRQ: Reference Signal Received Quality) of uplink signals transmitted from user terminals. When a plurality of cells (CCs) are provided, the measurement section 301 may measure the received quality of uplink signals on a per cell basis. The measurement section 301 outputs the measurement results to the TPC command generating section 302.

The TPC command generating section 302 generates TPC commands, which are used in closed-loop control, based on the measurement results in the measurement section 301. To be more specific, the TPC command generating section 302 generates TPC commands to represent the increase/decrease values of the transmission power of an uplink channel (PUSCH or PUCCH) (see FIG. 2). The TPC command generating section 302 outputs the generated TPC commands to the DCI generating section 303. Also, in accumulation mode, the TPC command generating section 302 may generate TPC commands based on TPC command-accumulated values.

The DCI generating section 303 generates downlink control information (DCI) and outputs this to the transmitting/receiving section 103. The DCI that is output from the transmitting/receiving section 103 is output to the user terminal 20 through the downlink control channel (PDCCH or EPDCCH).

To be more specific, the DCI generating section 303 generates DCI that includes TPC commands generated in the TPC command generating section 302. In the event of PUSCH TPC commands, the DCI generating section 303 may generate, for example, DCI formats 0/4 and 3/3A. In the event of PUCCH TPC commands, the DCI generating section 303 may generate, for example, DCI formats 1/1A/1B/1C/2A/2B/2C/2D and 3/3A.

Also, the DCI generating section 303 may generate DCI format 3/3A to command resetting of TPC command-accumulated values based on commands from the reset control section 306, which will be described later (see the seventh reset condition).

Also, when TDD is used, the DCI generating section 303 may generate DCI that includes UL-DL configuration switch command information (see the eighth reset condition).

The RRC message generating section 304 generates an RRC layer message (hereinafter referred to as "RRC message") and outputs this to the transmitting/receiving sections 103. The RRC message that is output to the transmitting/receiving sections 103 is transmitted to the user terminal 20 through a downlink shared channel (PDSCH).

To be more specific, the RRC message generating section 304 generates an RRC message including parameters for use in transmission power control. These parameters include, for example, the transmission power offset (for example, in above equation 1, $P_{O\_PUSCH,c}$ in the event of the PUSCH and $P_{O\_UE\_PUCCH}$ in the event of the PUCCH), the coefficient α, which is used in open-loop control, and so on.

Also, the RRC message generating section 304 may generate an RRC message to command a change of transmission power offset based on a command from the reset control section 306, which will be described later.

The MAC CE generating section 305 generates a MAC control element (MAC CE), which is signaled in the MAC layer, and outputs this to the transmitting/receiving section 103. The MAC CE that is output to the transmitting/receiving section 103 is transmitted to the user terminal 20 through MAC signaling.

To be more specific, the MAC CE generating section 305 may generate a MAC CE to include information to command resetting of TPC command-accumulated values (see the third reset condition) based on a command from the reset control section 306, which will be described later.

Also, the MAC CE generating section 305 may generate a MAC CE to include a timing advance (TA) command (see FIG. 6). Note that the transmission timing values (TA values) represented by TA commands are used in the above-described fourth reset condition. Also, the period in which no TA command is received is measured with a TA timer in the user terminal. This TA timer is used in the above-described fifth reset condition.

Also, the MAC CE generating section 305 may generate a MAC CE to include de-activation command information, which commands de-activation of SCells (see the sixth reset condition).

The reset control section 306 controls the resetting of TPC command-accumulated values. To be more specific, the reset control section 306 commands the DCI generating section 303, the MAC CE generating section 305 and the RRC message generating section 304 to generate DCI, a MAC CE and an RRC message, which serve as conditions for resetting TPC command-accumulated values.

Also, the reset control section 306 commands resetting of TPC command-accumulated values that are accumulated in the TPC command generating section 302.

FIG. 17 is a diagram to show a detailed structure of a user terminal 20 according to the present embodiment. As shown in FIG. 17, the user terminal 20 has a transmission power control section 401, a DCI acquiring section 402, a MAC CE acquiring section 403, an RRC message acquiring section 404 and a reset section 405 (control section).

The transmission power control section 401 controls the transmission power of an uplink channel (the PUCCH or the PUSCH) (open-loop control, closed-loop control). To be more specific, the transmission power control section 401, in accumulation mode, accumulates the increase/decrease values represented by TPC commands input from the DCI acquiring section 402, which will be described later, and calculates a TPC command-accumulated value.

The transmission power control section 401 determines the transmission power based on the TPC command-accumulated value, and commands the transmitting/receiving section 203 to transmit the uplink channel with the determined transmission power. For example, the transmission power control section 401 may calculate the TPC command-accumulated value by using above equation 2, and calculate the transmission power of the PUSCH by using above equation 1.

The DCI acquiring section 402 acquires DCI that is communicated from the radio base station 10 through a downlink control channel. To be more specific, the transmitting/receiving section 203 blind-decodes the downlink control channel (search space) and receives the DCI. The DCI acquiring section 402 acquires the DCI received in the transmitting/receiving section 203.

As mentioned earlier, the DCI might include a TPC command (DCI format 0/4, 3/3A, 1/1A/1B/1C/2A/2B/2C/2D). Also, TPC command reset command information may be included as well.

The MAC CE acquiring section 403 acquires the MAC CE communicated from the radio base station 10 through MAC signaling. To be more specific, the transmitting/receiving section 203 decodes MAC PDU that is sent by MAC signaling, and receives the MAC CE included in the MAC PDU. The MAC CE acquiring section 403 acquires the MAC CE received in the transmitting/receiving section 203.

As noted earlier, the MAC CE may include TPC command-accumulated value reset command information (see the third reset condition), include a TA command (see the fourth reset condition), or include de-activation command information which commands de-activation of SCells (see the sixth reset condition).

The RRC message acquiring section 404 acquires the RRC message communicated from the radio base station 10 through RRC signaling. To be more specific, the transmitting/receiving section 203 decodes and receives the RRC message that is sent through RRC signaling. The RRC message acquiring section 404 acquires the RRC message received in the transmitting/receiving section 203.

As described earlier, the RRC message may include transmission power offset (for example, $P_{O\_PUSCH,c}$ of above equation 1 in the event of the PUSCH, and $P_{O\_UE\_PUCCH}$ in the event of the PUCCH), or include change command information to command a change of this transmission power offset.

The reset section 405 decides whether or not the TPC command-accumulated value reset condition used in the transmission power control section 401 is fulfilled, and resets the above-noted TPC command-accumulated value when the reset condition is fulfilled. For the reset condition, the above-described first to eighth conditions 1 to 8 can be used (see the second aspect).

To be more specific, when the reset condition is fulfilled in a given cell, the reset section 405 may reset this given cell's TPC command-accumulated value.

Also, when the reset condition is fulfilled in one of a plurality of cells that are grouped, the reset section 405 may reset the TPC command-accumulated values of all of the multiple cells (see the above first aspect). In this case, a plurality of cells may be grouped into TAGs, which have been described earlier, may be grouped into CGs, or may be grouped into groups other than TAGs or CGs.

Also, in cells where dynamic TDD is used, it is possible to provide a plurality of subframe sets in a radio frame and execute transmission power control per subframe set (that is, use subframe-specific TPC command-accumulated values). The subframe sets may be, for example, the above-described fixed subframe set and flexible subframe set, but these are by no means limiting.

In this case, when the reset condition is fulfilled in one of a plurality of subframe sets, the reset section 405 may reset the TPC command-accumulated values of all of these multiple subframe sets (see the third aspect, FIG. 11A).

Also, when the reset condition is fulfilled in one of a plurality of subframe sets, the reset section 405 may reset the TPC command-accumulated value of the subframe set where the reset condition is fulfilled (see the third aspect, FIG. 11B).

Also, the reset section 405 may reset TPC command-accumulated values using different reset conditions on a per subframe set basis. For example, the reset section 405 may reset the TPC command-accumulated value of the fixed subframe set when the above-described first or second reset condition is fulfilled, and reset the TPC command-accumulated value of the flexible subframe set when the above-described eighth reset condition set is fulfilled.

With the radio communication system 1 according to the present embodiment, it is possible to reset TPC command-accumulated values in a simpler way so as to resolve mismatches in the recognition of TPC command-accumulated values. To be more specific, when the reset condition is fulfilled in one of a plurality of cells that are grouped, the TPC command-accumulated values of all of these multiple cells are reset, so that it is possible to simplify the process of resetting the TPC command-accumulated values of the multiple cells (first aspect).

Also, since the third to eighth reset conditions can be used apart from the first and second reset conditions, it is possible to simplify the process of resetting the TPC command-accumulated values of a single or a plurality of cells (second aspect).

Also, in cells where dynamic TDD is employed, when transmission power control is executed for every subframe set that is provided in a radio frame, it is possible to simplify the process of resetting the TPC command-accumulated value of each subframe set (third aspect).

Now, although the present invention has been described in detail with reference to the above embodiment, it should be obvious to a person skilled in the art that the present invention is by no means limited to the embodiment described herein. The present invention can be implemented with various corrections and in various modifications, without departing from the spirit and scope of the present invention defined by the recitations of claims. Consequently, the description herein is provided only for the purpose of explaining examples, and should by no means be construed to limit the present invention in any way. For example, the examples described above may be combined and implemented as appropriate.

The disclosure of Japanese Patent Application No. 2014-004182, filed on Jan. 14, 2014, including the specification, drawings and abstract, is incorporated herein by reference in its entirety.

The invention claimed is:

1. A user terminal controlling uplink transmission power, comprising:
   a receiver that receives transmission power control (TPC) commands; and
   a processor that controls the uplink transmission power based on an accumulated value of the TPC commands,
   wherein subframes in a radio frame are divided into a first subframe set and a second subframe set, and the processor calculates a first accumulated value of the TPC commands for the first subframe set and a second accumulated value of the TPC commands for the second subframe set, and resets the second accumulated value using a reset condition which is different from a reset condition of the first accumulated value, and
   wherein the second accumulated value is reset independently of the first accumulated value.

2. The user terminal according to claim 1, wherein the uplink transmission power is transmission power of an uplink shared channel.

3. A radio base station comprising:
   a processor that generates transmission power control (TPC) commands for use in controlling of uplink transmission power in a user terminal; and
   a transmitter that transmits the TPC commands to the user terminal,
   wherein subframes in a radio frame are divided into a first subframe set and a second subframe set, and a first accumulated value of the TPC commands for the first subframe set and a second accumulated value of the TPC commands for the second subframe set is calculated in the user terminal, and the second accumulated value of the TPC commands is reset in the user terminal using a reset condition which is different from a reset condition of the first accumulated value, and
   wherein the second accumulated value is reset independently of the first accumulated value.

4. The radio base station according to claim 3, wherein the uplink transmission power is transmission power of an uplink shared channel.

5. A radio communication method for use in controlling of uplink transmission power in a user terminal, the radio communication method comprising:
   receiving transmission power control (TPC) commands; and
   controlling the uplink transmission power based on an accumulated value of the TPC commands,
   wherein subframes in a radio frame are divided into a first subframe set and a second subframe set, and the user terminal calculates a first accumulated value of the TPC commands for the first subframe set and a second accumulated value of the TPC commands for the second subframe set, and controls resetting of the second accumulated value using a reset condition which is different from a reset condition of the first accumulated value, and wherein the second accumulated value is reset independently of the first accumulated value.

6. The radio communication method according to claim 5, wherein the uplink transmission power is transmission power of an uplink shared channel.

\* \* \* \* \*